US008854608B2

(12) United States Patent
Onoda et al.

(10) Patent No.: US 8,854,608 B2
(45) Date of Patent: Oct. 7, 2014

(54) OPTICAL FIBER SENSING SYSTEM

(75) Inventors: Seiichi Onoda, Tokorozawa (JP);
Keiichi Inoue, Saitama (JP); Masayuki Nakano, Saitama (JP)

(73) Assignees: Kabushikikaisha Watanabeseisakusyo, Saitama (JP); Onoda, Seiichi, Saitama (JP)

( * ) Notice: Subject to any disclaimer, the term of this patent is extended or adjusted under 35 U.S.C. 154(b) by 501 days.

(21) Appl. No.: 13/059,821

(22) PCT Filed: Aug. 20, 2009

(86) PCT No.: PCT/JP2009/064582
§ 371 (c)(1),
(2), (4) Date: Feb. 18, 2011

(87) PCT Pub. No.: WO2010/021362
PCT Pub. Date: Feb. 25, 2010

(65) Prior Publication Data
US 2011/0141459 A1      Jun. 16, 2011

(30) Foreign Application Priority Data

Aug. 20, 2008  (JP) .................................. 2008-212111
Aug. 20, 2008  (JP) .................................. 2008-212112

(51) Int. Cl.
*G01N 21/00*   (2006.01)
*G01D 5/26*    (2006.01)
*G01D 5/30*    (2006.01)
*G01B 11/16*   (2006.01)

(52) U.S. Cl.
CPC ............... *G01B 11/18* (2013.01); *G01D 5/268* (2013.01); *G01D 5/30* (2013.01)
USPC ........................................................ 356/73.1

(58) Field of Classification Search
USPC ...................................................... 356/73.1
See application file for complete search history.

(56) References Cited

U.S. PATENT DOCUMENTS

| 6,674,928 | B2 * | 1/2004 | Johnson et al. ................. 385/12 |
| 7,696,471 | B2 | 4/2010 | Ogisu et al. |
| 2007/0171402 | A1 | 7/2007 | Watley et al. |
| 2011/0255078 | A1 * | 10/2011 | Goldner et al. ............. 356/73.1 |

FOREIGN PATENT DOCUMENTS

JP   56-21010   2/1981
JP   56-51015   5/1981

(Continued)

OTHER PUBLICATIONS

International Search Report issued Nov. 10, 2009 in corresponding International Application No. PCT/JP2009/064582.

*Primary Examiner* — Tarifur Chowdhury
*Assistant Examiner* — Hina F Ayub
(74) *Attorney, Agent, or Firm* — Wenderoth, Lind & Ponack, L.L.P.

(57) ABSTRACT

An optical fiber sensing system carries out accurate measurements while avoiding measurement noise factors. For example, effects of the emission power of a light source, fiber insertion loss, fluctuations in the sensitivity of a photo detector, fluctuations in the amplitude of an amplifier, the loss of optical energy due to bending of an optical fiber, the loss of optical energy due to connecting two or more optical fibers, and gain fluctuations of electric circuitry provided on a platform do not affect measurements. A reflective sensor is connected to an end of an optical fiber connected to a light source. The light source outputs physical measurement light and reflected light coming from the reflective sensor is separated into two beams of light. Information on the physical quantity of a measurement target object is detected on the basis of an intensity ratio of the two beams.

9 Claims, 43 Drawing Sheets

(56) References Cited

FOREIGN PATENT DOCUMENTS

| JP | 63-82320 | 4/1988 |
| JP | 2004-309218 | 11/2004 |
| JP | 2005-114512 | 4/2005 |
| JP | 2007-535674 | 12/2007 |
| JP | 2008-64747 | 3/2008 |
| JP | 2008-139171 | 6/2008 |

* cited by examiner

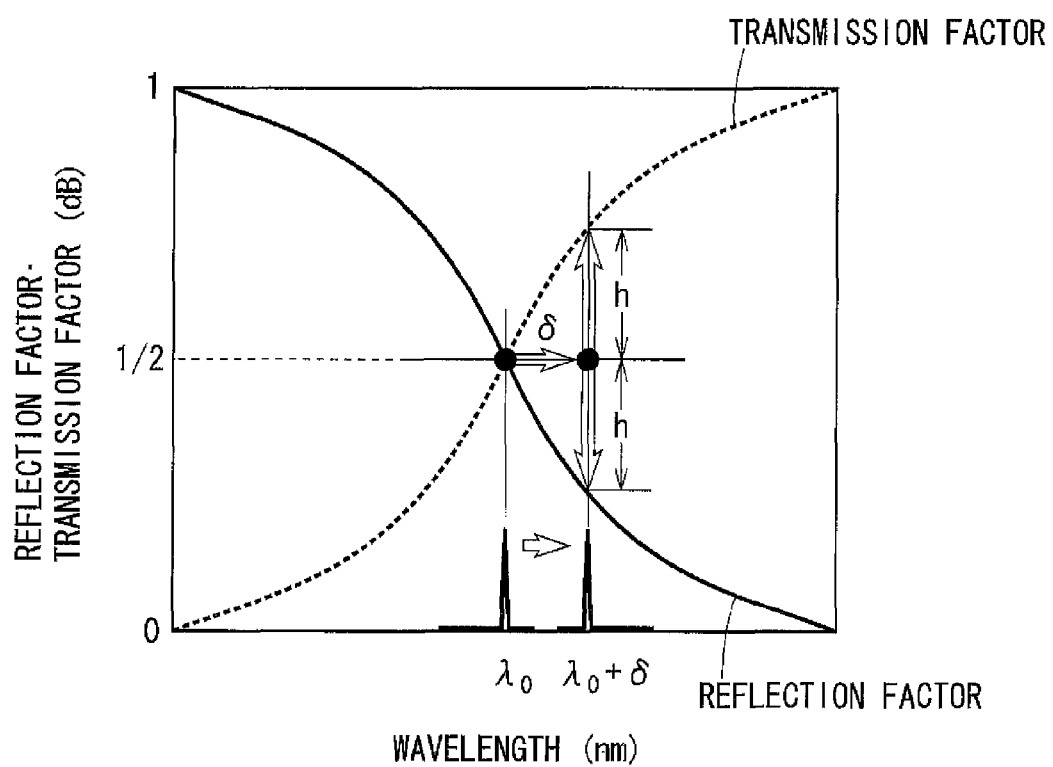

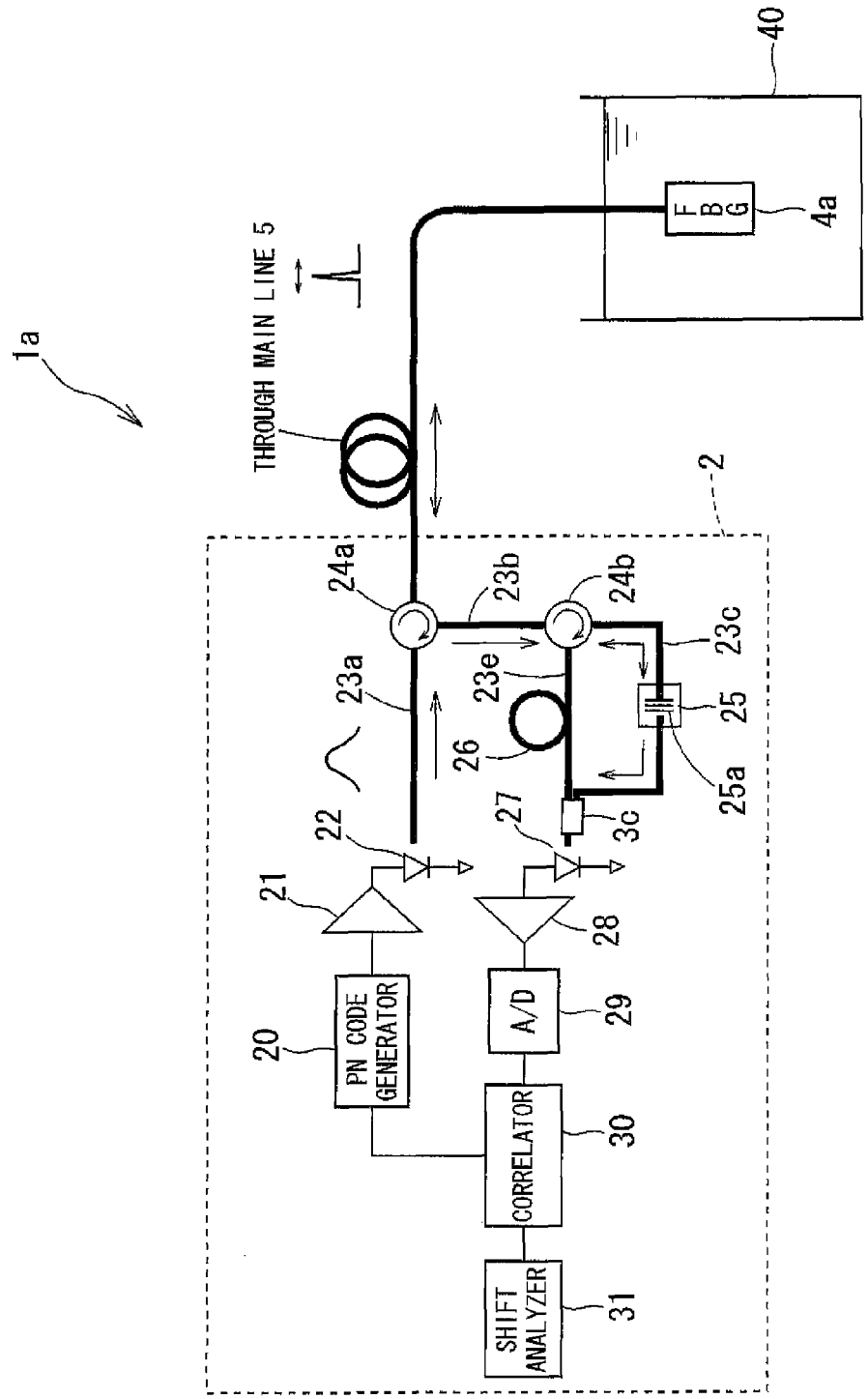

OPTICAL FIBER SENSING SYSTEM

BACKGROUND OF INVENTION

1. Technical Field

The present invention relates to an optical fiber sensing system that measures the physical quantity of a measurement target object with the use of an optical fiber.

2. Background Art

Recently, a method of using an optical fiber as a sensor for detecting, for example, ground deformation, the distortion or deformation of a structure, etc., has been proposed. An example of such a method is FBG (Fiber Bragg Grating).

In the FBG method, an ultraviolet laser beam is applied to a specified core region of an optical fiber for cyclic refractive index modulation in the direction of the length of the fiber. As its optical property, it exclusively reflects light in a specified spectral range in sync with the cycle, whereas light having any other wavelength is allowed to pass therethrough. The FBG method utilizes such optical property.

If external pressure is applied to the region irradiated with the ultraviolet laser beam, or if ambient temperature changes, the index of refraction changes, which causes a shift in the wavelength of light reflected by the region. It is possible to detect, for example, ground deformation, the temperature of liquid, the displacement, distortion, deformation, etc. of a structure as described above by measuring the wavelength shift of return light.

For example, a technique for detecting whether any shock was applied to a composite material or not as well as detecting the position of the composite material and measuring the size thereof with high precision by using an FBG is disclosed in Patent Document 1. A technique for measuring the distortion of a measurement target object by using an FBG is disclosed in Patent Document 2.

Patent Document 1: Japanese Unexamined Patent Application Publication No. 2008-139171
Patent Document 2: Japanese Unexamined Patent Application Publication No. 2004-309218

SUMMARY OF INVENTION

However, the following measurement noise factors other than the physical-quantity attribute of a measurement target object could have an influence on measurement accuracy, making it impossible to measure the physical quantity of the measurement target object with high precision: the effects of the emission power of a light source, fiber insertion loss, fluctuations in the sensitivity of a photo detector, fluctuations in the amplitude of an amplifier or other fluctuations, the loss of optical energy due to the bending of an optical fiber (bending loss), the loss of optical energy due to the connecting of two or more optical fibers by means of connectors (connector loss), the gain fluctuations of electric circuitry provided on a platform, and so forth. Therefore, an optical fiber sensing system that can measure the physical quantity of a measurement target object accurately without being affected by these measurement noise factors is awaited.

The present invention has been made in view of the above problem. An object of the invention is to provide an optical fiber sensing system that can carry out measurement accurately without being affected by external measurement noise factors, that is, the above factors other than the physical-quantity attribute of a measurement target object, though not limited thereto.

The above problem can be solved by the following means.

An optical fiber sensing system comprising:
an optical branching section that is connected to a light source that outputs physical measurement light;
a first optical fiber that is connected to the optical branching section;
at least one reflective sensor that is connected to an end of the first optical fiber, the reflective sensor returning light with a reflection spectrum obtained by modulating the physical measurement light in accordance with a change in physical quantity of a measurement target object to the first optical fiber;
a light separating section that is connected to a branch line of the optical branching section, the light separating section separating incoming light into two beams of light whose intensity changes complementarily in accordance with a change in the reflection spectrum of the return light from the reflective sensor;
second and third optical fibers that are optical paths of the respective two beams of light coming from the light separating section;
a dummy fiber that is connected to the second optical fiber, the dummy fiber adding a predetermined time difference (optical path difference) to one of the two beams of light separated by the light separating section;
an optical coupler that couples an end of the third optical fiber with an end of the dummy fiber;
a light receiving section that receives the light from the optical coupler; and
a detecting section that calculates amount of the physical change of the measurement target object on the basis of a ratio of the intensity of said one of the two beams of light and the intensity of the other.

The light separating section includes a wavelength tilt filter and a circulator.

The light separating section is a wavelength tilt filter.

The optical fiber sensing system further comprises a temperature keeping section that keeps ambient temperature of the light separating section constant.

An optical fiber sensing system comprising:
an optical fiber that is connected to a light source that outputs physical measurement light;
a reflective sensor unit that includes a light separating section and a dummy fiber, the light separating section being connected to one of two branch lines bifurcating at an optical coupler that is connected to an end of the optical fiber, the light separating section separating the physical measurement light into two beams of light whose intensity changes complementarily in accordance with a change in physical quantity of a measurement target object, the light separating section returning one of the two separated beams of light to the optical coupler, the dummy fiber being connected at one end to the light separating section, the dummy fiber adding a predetermined time difference (optical path difference) to the other of the two beams of light separated by the light separating section, the reflective sensor unit being formed by connecting the other of the two branch lines bifurcating at the optical coupler and the other end of the dummy fiber, the reflective sensor unit returning the other of the two separated beams of light to the optical coupler via the dummy fiber;
an optical branching section that is connected to a light-source-side end of the optical fiber;
a light receiving section that is connected to a terminal of the optical branching section, the light receiving section receiving the two separated beams of light; and
a detecting section that calculates amount of the physical change of the measurement target object on the basis of a ratio of the intensity of said one of the two beams of light received by the light receiving section and the intensity of the other.

The light separating section includes a reflector plate and a transparent plate that are provided not in parallel with a direction of the light, which is collimated; and the intensity of either transmitted light or reflected light, or the intensity of both the transmitted light and the reflected light, changes due to displacement of either the reflector plate or the transparent plate, or both the reflector plate and the transparent plate, in accordance with the physical quantity of the measurement target object.

The optical fiber has an optical branch line, which branches from an optical main line of the optical fiber by means of an optical branching device; and the reflective sensor is provided on the optical branch line.

The optical fiber has a plurality of optical lines branching from an optical main line of the optical fiber by means of an optical branching device; and the reflective sensor is provided on each of the plurality of optical branch lines.

The optical fiber sensing system further comprises:

a PN code generator that generates a pseudo random signal;

a modulating section that modulates the physical measurement light on the basis of the pseudo random signal generated by the PN code generator;

a converting section that converts the two beams of light received by the light receiving section into electric signals; and a correlating section that correlates the electric signals obtained by the conversion with the pseudo random signal sent from the PN code generator to calculate the intensity of said one of the two beams of light and the intensity of the other.

An optical fiber sensing system comprising:

an optical branching section that is connected to a light source that outputs physical measurement light;

an optical fiber that is connected to the optical branching section;

at least one reflective sensor that is connected to an end of the optical fiber, the reflective sensor returning light with a reflection spectrum obtained by modulating the physical measurement light in accordance with a change in physical quantity of a measurement target object to the optical fiber;

an optical coupler that is connected to a branch line of the optical branching section;

a loop optical path that includes a light separating section and a dummy fiber, the light separating section being connected to one of two branch lines bifurcating at the optical coupler, the light separating section separating incoming light into two beams of light whose transmission and reflection levels change complementarily in accordance with a change in the reflection spectrum of the return light from the reflective sensor, the light separating section returning one of the two separated beams of light to the optical coupler, the dummy fiber being connected at one end to the light separating section, the dummy fiber adding a predetermined time difference (optical path difference) to said one of the two beams of light separated by the light separating section, the loop optical path being formed by connecting the other end of the dummy fiber and the other of the two branch lines bifurcating at the optical coupler, the loop optical path returning the other of the two beams of light separated by the light separating section after incidence through said one of the two branch lines bifurcating at the optical coupler from the optical coupler, the other of the two separated beams of light being returned to the optical coupler via the other of the two branch lines bifurcating at the optical coupler;

a light receiving section that receives the two beams of light separated by the light separating section with the time difference therebetween from the optical coupler and further receives another beam of light having propagated through the loop optical path from the optical coupler; and a detecting section that calculates amount of the physical change of the measurement target object on the basis of an intensity ratio of the three beams of light received by the light receiving section.

An optical fiber sensing system comprising:

an optical fiber that is connected to a light source that outputs physical measurement light;

a reflective sensor unit that includes a loop optical path that includes a light separating section and a dummy fiber, the light separating section being connected to one of two branch lines bifurcating at an optical coupler, the light separating section separating incoming light into two beams of light whose transmission and reflection levels change complementarily in accordance with a change in a reflection spectrum of return light from a reflective sensor, the light separating section returning one of the two separated beams of light to the optical coupler, the dummy fiber being connected at one end to the light separating section, the dummy fiber adding a predetermined time difference (optical path difference) to said one of the two beams of light separated by the light separating section, the loop optical path being formed by connecting the other end of the dummy fiber and the other of the two branch lines bifurcating at the optical coupler, the loop optical path returning the other of the two beams of light separated by the light separating section after incidence through said one of the two branch lines bifurcating at the optical coupler from the optical coupler, the other of the two separated beams of light being returned to the optical coupler via the other of the two branch lines bifurcating at the optical coupler;

an optical branching section that is connected to a light-source-side end of the optical fiber;

a light receiving section that is connected to the optical branching section, the light receiving section receiving the two separated beams of light with the time difference therebetween and further receiving another beam of light having propagated through the loop optical path; and a detecting section that calculates amount of the physical change of the measurement target object on the basis of an intensity ratio of the three beams of light received by the light receiving section.

The light separating section includes a reflector plate and a transparent plate that are provided not in parallel with a direction of the light, which is collimated; and the intensity of either transmitted light or reflected light, or the intensity of both the transmitted light and the reflected light, changes due to displacement of either the reflector plate or the transparent plate, or both the reflector plate and the transparent plate, in accordance with the physical quantity of the measurement target object.

The optical fiber has an optical branch line, which branches from an optical main line of the optical fiber by means of an optical branching device; and the reflective sensor unit is provided on the optical branch line.

The optical fiber has a plurality of optical lines branching from an optical main line of the optical fiber by means of an optical branching device; and the reflective sensor unit is provided on each of the plurality of optical branch lines.

The optical fiber sensing system further comprises:

a PN code generator that generates a pseudo random signal;

a modulating section that modulates the physical measurement light on the basis of the pseudo random signal generated by the PN code generator;

a converting section that converts the three beams of light received by the light receiving section into electric signals; and a correlating section that correlates the electric signals obtained by the conversion with the pseudo random signal sent from the PN code generator to calculate the intensity of said one of the two beams of light and the intensity of the other.

A single light receiving section receives two separated beams of light.

The incoming light (return light) is separated into two beams of light whose intensity changes complementarily in accordance with a change in the physical quantity of a measurement target object. Information on the physical quantity of the measurement target object is detected on the basis of a ratio of the intensity of one of the two beams of light and the intensity of the other, thereby offsetting the effects of measurement noise factors other than the physical-quantity attribute of the measurement target object, for example, twists in an optical fiber. Therefore, it is possible to carry out measurement with high precision.

The light separating section includes a wavelength tilt filter and a circulator. Return light from the reflective sensor can be separated into the two beams by means of the wavelength tilt filter. In addition, it is possible to guide the return light from the reflective sensor and the two separated beams in predetermined directions.

It is possible to separate, by means of the wavelength tilt filter only, the return light from the reflective sensor into the two beams and guide the two separated beams in predetermined directions. Such a configuration makes it possible to reduce the manufacturing cost of the light separating section.

The ambient temperature of the light separating section is kept constant. Therefore, it is possible to prevent the result of measurement from being affected by a temperature change.

Light is separated into two beams whose intensity changes complementarily in accordance with a change in the physical quantity of a measurement target object at a reflective sensor unit. Information on the physical quantity of the measurement target object is detected on the basis of a ratio of the intensity of one of the two beams of light and the intensity of the other, thereby offsetting the effects of measurement noise factors other than the physical-quantity attribute of the measurement target object, for example, twists in an optical fiber. Therefore, it is possible to carry out measurement with high precision.

A collimated beam can be used as the physical measurement light. With a wider optical range, it is possible to carry out measurement with high precision.

A plurality of reflective sensors can be provided in serial arrangement. Therefore, it is possible to carry out concurrent multipoint measurement.

A plurality of reflective sensors can be provided in parallel arrangement. Therefore, it is possible to carry out concurrent multipoint measurement.

A pseudo random code is used for measurement. With such a configuration, the dynamic range of light entering an optical fiber can be controlled easily by adjusting the length of the pseudo random code. For example, it is possible to measure a very small change in the physical quantity of a measurement target object by using a long code.

Return light from a reflective sensor can be separated into three beams of light. The physical quantity of a measurement target object can be detected on the basis of an intensity ratio of the three beams of light. Therefore, it is possible to carry out measurement with increased precision.

Physical measurement light can be separated into three beams of light in accordance with a change in the physical quantity of a measurement target object at a reflective sensor unit. The physical quantity of the measurement target object can be detected on the basis of an intensity ratio of the three beams of light. Therefore, it is possible to carry out measurement with increased precision.

A collimated beam can be used as the physical measurement light. With a wider optical range, it is possible to carry out measurement with high precision.

A plurality of reflective sensors can be provided in serial arrangement. Therefore, it is possible to carry out concurrent multipoint measurement.

A plurality of reflective sensors can be provided in parallel arrangement. Therefore, it is possible to carry out concurrent multipoint measurement.

A pseudo random code is used for measurement. With such a configuration, the dynamic range of light entering an optical fiber can be controlled easily by adjusting the length of the pseudo random code. For example, it is possible to measure a very small change in the physical quantity of a measurement target object by using a long code.

In the invention claimed in Claim 16, a single light receiving section receives two separated beams of light. Since measurement accuracy is not influenced by a difference in the characteristics of a plurality of photo detectors, it is possible to carry out measurement with high precision.

BRIEF DESCRIPTION OF DRAWINGS

FIG. 1 is a diagram that illustrates the overall configuration of an optical fiber sensing system according to a first embodiment of the invention;

FIG. 2(a) is a diagram that illustrates an example of a pseudo random code generated by a PN code generator; FIG. 2(b) is a diagram that illustrates physical measurement light that goes into an optical fiber;

[FIG. 3] FIG. 3 is a diagram that illustrates the transmission and reflection factors of light reflected by a sensor, which goes into the wavelength tilt filter 25a, relative to its wavelength;

[FIG. 4]

FIG. 5 is a diagram that illustrates a method for calculating a wavelength shift;

FIG. 6 is a diagram that illustrates a shift in reflection and transmission pulses;

[FIG. 7]

[FIG. 8]

[FIG. 9]

[FIG. 10] FIG. 10 is a diagram that illustrates a configuration for measuring the temperature of liquid in a container with the use of an optical fiber sensing system 1;

FIG. 11 is a diagram that illustrates the light emission spectrum of the broadband light source 22;

FIG. 12 is a diagram that illustrates the reflection spectrum of a band pass filter;

FIG. 13 is a diagram that illustrates a change in wavelength for given temperature;

FIG. 14 is a diagram that illustrates the temperature characteristics of center wavelength;

FIG. 15 is a diagram that illustrates waveform response when the temperature of water is 30° C.;

FIG. 16 is a diagram that illustrates waveform response when the temperature of water is 56° C.;

FIG. 17 is a diagram that illustrates a calibration curve;

FIG. 18 is a diagram that shows the result of measurement carried out under the following conditions: a container was filled with hot water with a temperature of 70° C.; an FBG 4a and a thermometer were immersed in the hot water; the container with the hot water was left to stand for natural cooling;

FIG. 19 is a diagram that illustrates correlation between the temperature values indicated by the thermometer and the measured values;

FIG. 20 is a diagram that illustrates a first variation example of an optical fiber sensing system according to the first embodiment of the invention;

FIG. 21 is a diagram that illustrates a second variation example of an optical fiber sensing system according to the first embodiment of the invention;

FIG. 22 is a diagram that illustrates the configuration of an optical fiber sensing system according to a second embodiment of the invention;

FIG. 23(a) is a diagram that illustrates an example of a pseudo random code generated by a PN code generator; FIG. 23(b) is a diagram that illustrates physical measurement light that goes into an optical fiber;

FIG. 24 is a diagram that illustrates an example of the configuration of a position change sensor unit;

FIG. 25 is a diagram that illustrates, in a cross section, the position change sensor;

FIG. 27(a) is a diagram that illustrates a change in transmission and reflection factors relative to displacement; FIG. 27(b) is a diagram that illustrates a ratio of transmission factor/reflection factor relative to displacement;

FIG. 28 is a diagram that illustrates the cross-sectional distribution of a collimated beam;

FIG. 29 is a diagram that illustrates the cross-sectional distribution of the intensities of a collimated beam;

FIG. 30 is a diagram that illustrates a change in transmission and reflection levels relative to a normal change in position x/w, which is displacement normalized with the beam diameter w of physical measurement light;

FIG. 31 is a diagram that illustrates a change in the transmission/reflection factor ratio ($\zeta$) relative to the normal change in position x/w in a range of $|x/w|<1$;

FIG. 32 is a diagram that illustrates a change in the transmission/reflection factor ratio ($\zeta$) relative to the change in position (x) with the beam diameter w of physical measurement light taken as a parameter;

FIG. 33 is a diagram that illustrates a change in the transmission/reflection factor ratio ($\zeta$) relative to the normal change in position x/w, that is, displacement normalized with the beam diameter w of physical measurement light;

FIG. 34 is a diagram that illustrates the configuration of an apparatus used for experimental measurement;

FIG. 35 is a diagram that illustrates the waveform of reflex response when the displacement applied by the displacement application device is 0.21 mm;

FIG. 36 is a diagram that illustrates the waveform of reflex response when the displacement applied by the displacement application device is 0.11 mm;

FIG. 37 is a diagram that illustrates the photo detection level of transmitted light and the photo detection level of reflected light relative to the change in position (x);

FIG. 38 is a diagram that illustrates a relationship between the change in position (x) and the ratio of the photo detection level of transmitted light/the photo detection level of reflected light ($\zeta$);

FIG. 39 is a diagram that illustrates the configuration of a temperature sensor unit according to Example 2;

FIG. 40 is a diagram that illustrates reflection and transmission factors for light incident on a tilt filter;

FIG. 41 is a diagram that illustrates a relationship between temperature and the transmission/reflection power ratio ($\zeta$);

FIG. 42 is a diagram that illustrates the configuration of a temperature sensor unit according to Example 3;

FIG. 43 is a diagram that illustrates, as Example 4, a configuration for concurrent measurement of a change in position and temperature by means of a position change sensor unit and a temperature sensor unit;

FIG. 44 is a diagram that illustrates the reflex response of each of the position change sensor unit and the temperature sensor unit;

FIG. 45 is a diagram that illustrates a variation example of the reflective sensor unit; and

FIG. 46 is a diagram that illustrates modes of optical fiber connection.

DETAILED DESCRIPTION OF INVENTION

With reference to the accompanying drawings, best modes for carrying out the inventions claimed in the claims of the subject application (hereinafter simply referred to as "present invention") will now be explained.

(First Embodiment)

First of all, a first embodiment of the present invention will now be explained with reference to drawings.

(Overall Configuration)

Figure 1:
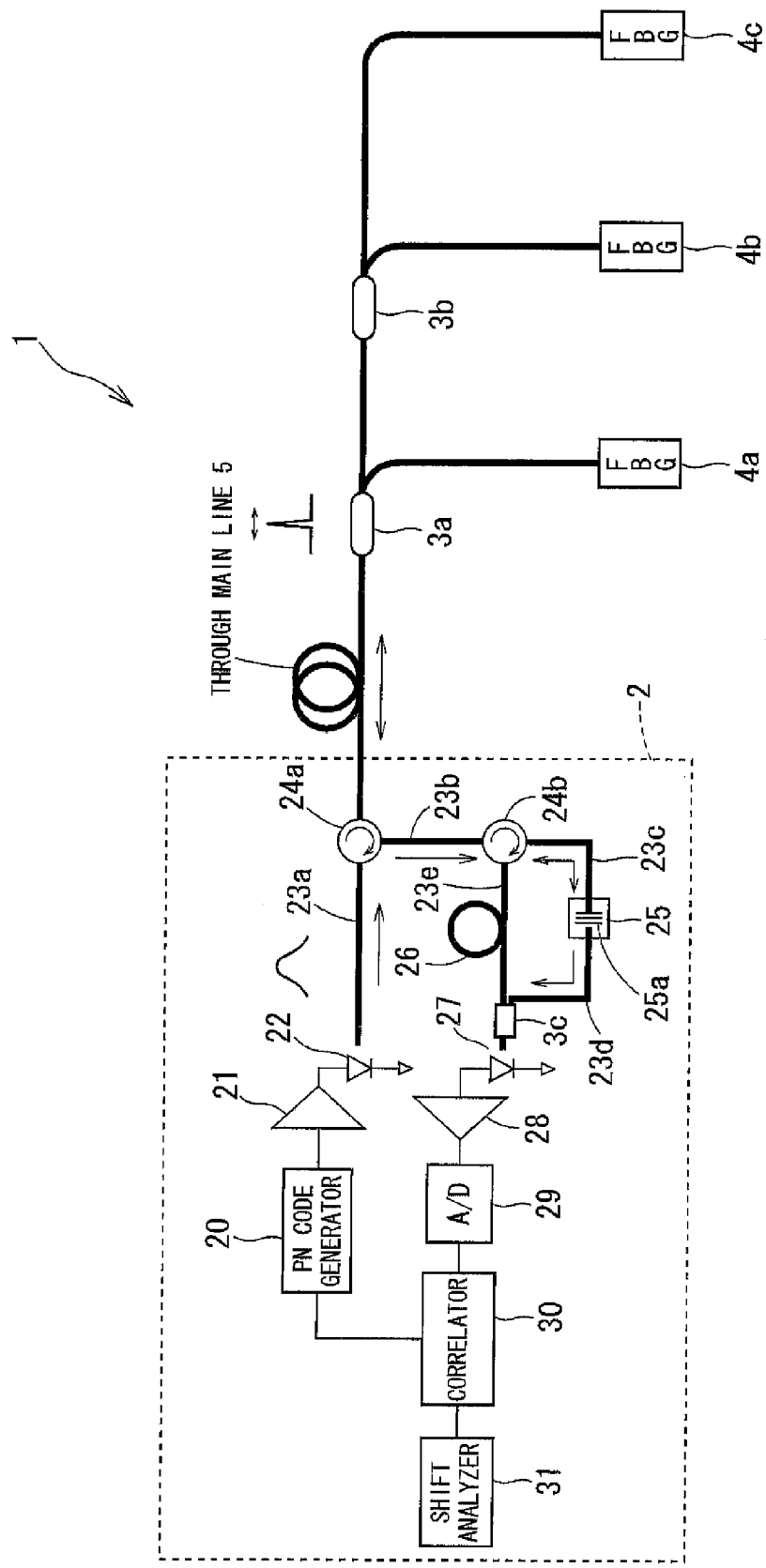
[FIG. 1]

FIG. 1 is a diagram that illustrates the overall configuration of an optical fiber sensing system according to a first embodiment of the invention.

As illustrated in FIG. 1, an optical fiber sensing system 1 includes a measurement apparatus 2, optical couplers 3a and 3b, and FBGs 4a, 4b, and 4c, etc. The two optical couplers 3a and 3b are inserted on a through main line 5. The FBGs 4a and 4b are connected to the ends of respective branch lines, which branch at the optical couplers 3a and 3b from the through main line 5. The FBG 4c is connected to the end of the through main line 5.

The measurement apparatus 2 includes a PN code generator 20, a light source driver 21, a broadband light source 22, optical fibers 23a, 23b, 23c, 23d, and 23e, circulators 24a and 24b, a temperature control mechanism 25, a wavelength tilt filter 25a, a dummy fiber 26, an optical coupler 3c, a PD (photodiode) 27, a preamplifier 28, an A/D converter 29, a correlator 30, and a shift analyzer 31, etc.

Figure 2:
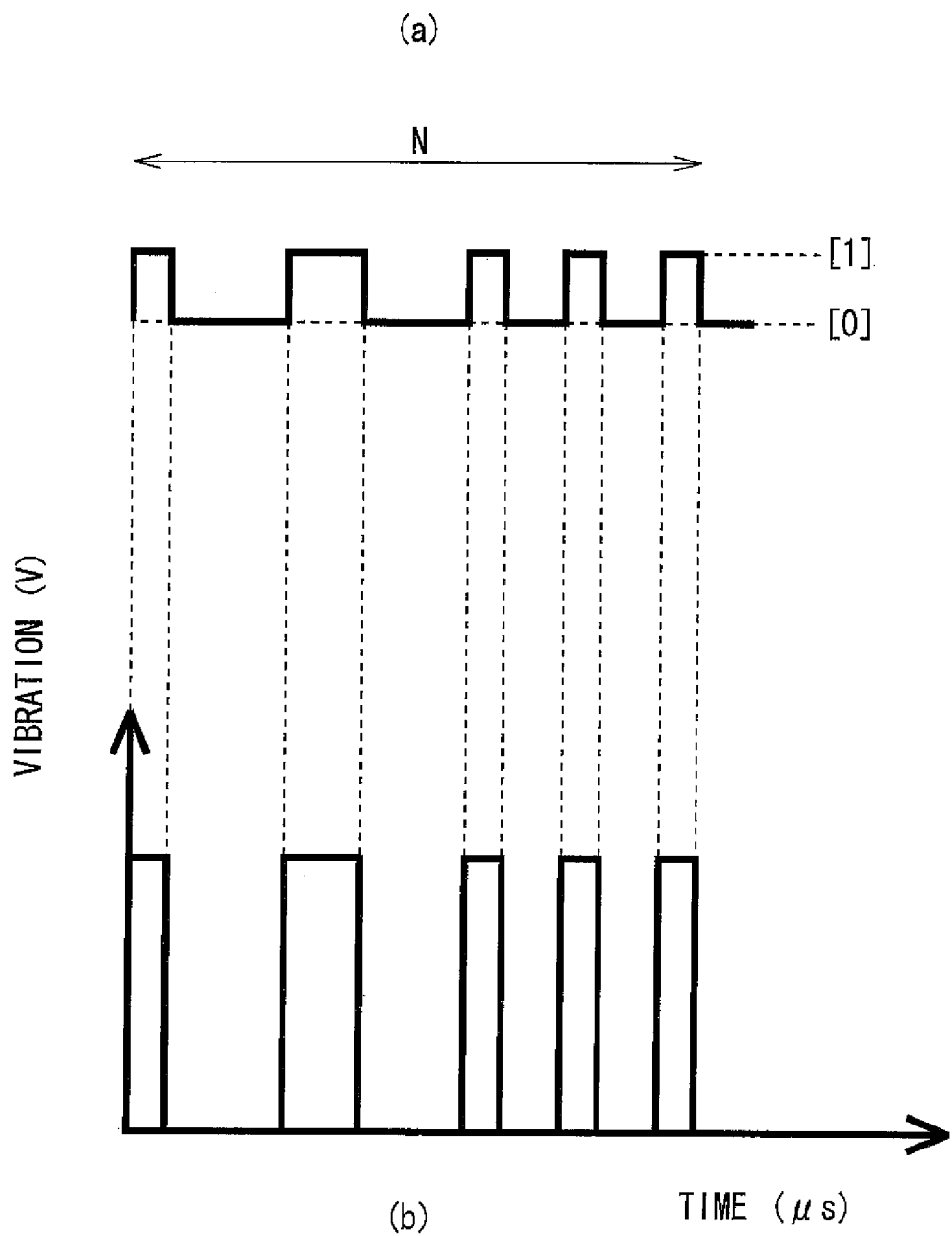
[FIG. 2]

The PN code generator 20 generates a maximum length sequence pseudo random code having a code length of N (hereinafter referred to as "pseudo random code"), which is illustrated in FIG. 2(a), at a predetermined chip rate and sends a pseudo random signal to the light source driver 21 and the correlator 30.

As the length of a pseudo random code increases, the occurrence probability of 0 becomes more equal to that of 1, which makes it possible to generate a code with high precision. In addition, since the peak value of light that enters an optical fiber increases as it increases, it is possible to measure return light having a low reflection level (e.g., Rayleigh scattering) with high precision. For example, when the reflection gain of Rayleigh scattering is −60 dB, it is possible to carry out measurement with high precision by setting the length of a code at $N=2^{21}-1$ (which corresponds to a gain of 63 dB) or greater.

Though an M-sequence pseudo random code is used in the present embodiment, the scope of the present invention is not limited thereto. Other pseudo random codes, for example, a Gold sequence pseudo random code, may be used.

Driven by means of a pseudo random code sent from the PN code generator 20, the light source driver 21 performs PN modulation on light emitted from the broadband light source 22 on the basis of the pseudo random code (light that has been subjected to the modulation will hereinafter be referred to as "physical measurement light"). The physical measurement light enters the optical fiber 23a.

For example, when the PN code generator 20 generates a pseudo random code having the N code length illustrated in FIG. 2(a), physical measurement light illustrated in FIG. 2(b) goes into the optical fiber 23a from the broadband light source 22.

A super-luminescent diode (SLD) is used as a typical example of the broadband light source 22. If it is not necessary to ensure a wide dynamic range for measurement, a combination of a light emitting diode and a multimode fiber having a large core diameter may be used as a substitute for the SLD.

Each of the circulators 24a and 24b has three input/output ports. Light that goes into a first port goes out from a second port. Light that goes into the second port goes out from a third port. Each of the circulators 24a and 24b does not allow light to pass therethrough in other directions: light that goes into the second port does not go out from the first port; light that goes into the third port does not go out from the first port or the second port; light that goes into the first port does not go out from the third port.

Specifically, for example, the circulator 24a outputs light coming from the optical fiber 23a to the through main line 5 and outputs light coming from the through main line 5 to the optical fiber 23b. The circulator 24b outputs light coming from the optical fiber 23b to the optical fiber 23c and outputs light coming from the optical fiber 23c to the optical fiber 23e.

The temperature control mechanism 25 keeps the temperature of the wavelength tilt filter 25a constant.

In accordance with the wavelength of light that has returned from the FBG 4a, 4b, 4c, the wavelength tilt filter 25a separates it into transmitted light and reflected light whose intensity (levels) changes in a complementary manner.

The circulator 24b and the wavelength tilt filter 25a make up a light separating means. A tilt filter that is formed by vapor-depositing a dielectric multilayer film as a filter on an end face of an optical fiber, an edge filter, or the like can be used as the wavelength tilt filter 25a.

FIG. 3 is a diagram that illustrates the transmission and reflection factors of light going into the wavelength tilt filter 25a relative to its wavelength.

As illustrated in FIG. 3, the transmission factor is equal to the reflection factor when the wavelength of light is λ0. The transmission and reflection factors change complementarily in such a manner that the sum of the transmission factor and the reflection factor is always one if filtering loss is not taken into consideration.

Figure 4A:
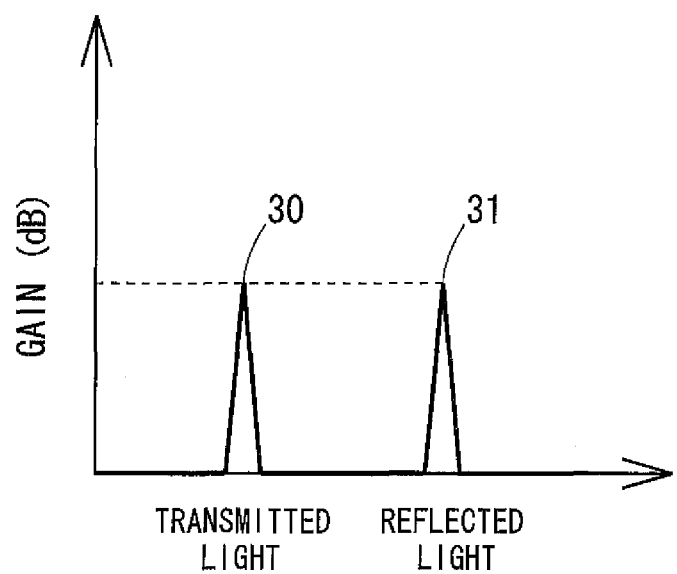
FIGS. 4(a) and 4(b) are diagrams that comparatively illustrate the gain of reflected light relative to physical measurement light going into an optical fiber 23a and the gain of transmitted light relative to the physical measurement light.
Figure 4B:
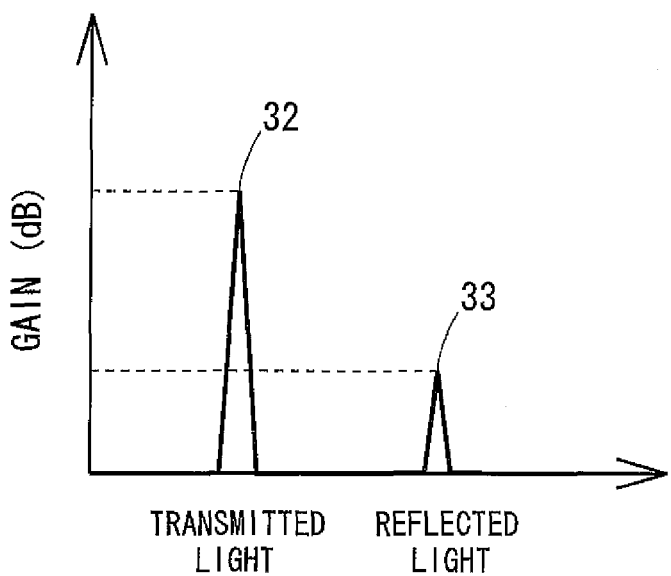

FIGS. 4(a) and 4(b) are diagrams that illustrate the response waveforms of transmitted light and reflected light.

Since the transmission factor is equal to the reflection factor when the wavelength of light going into the wavelength tilt filter 25a is λ0 as described above, the level 30 of transmitted light is equal to the level 31 of reflected light as illustrated in FIG. 4(a).

On the other hand, when the wavelength of return light shifts due to a change in the physical quantity of a measurement target object, for example, when it shifts into λ0+δ, the transmission factor increases by h whereas the reflection factor decreases by h as illustrated in FIG. 3(a). Consequently, as illustrated in FIG. 4(b), the level 32 of transmitted light becomes higher whereas the level 31 of reflected light becomes lower.

The dummy fiber 26 gives rise to an optical path difference between the path of a transmitted beam and that of a reflected beam that have been separated from each other by the wavelength tilt filter 25a. The optical path difference is not smaller than the distance resolving power of the measurement apparatus 2. Though the length of the dummy fiber 26 is arbitrary, it is not smaller than a distance resolving power that is determined depending on the chip rate of the PN code generator 20.

The distance resolving power is calculated using the following formula.

$$\text{Distance Resolving Power } \Delta L = 4 \times (100/fc)(m)$$

(where fc denotes the chip rate of the PN code generator 20)

For example, when the chip rate is 10 MHz, the minimum required length of the dummy fiber 26 is 40 m.

Though the dummy fiber 26 is provided on the optical fiber 23e in the present embodiment of the invention, it may be provided on the optical fiber 23d.

The optical coupler 3c multiplexes, that is, combines, the reflected light coming from the optical fiber 23e with the transmitted light coming from the optical fiber 23d.

The PD 27 is, for example, a photodiode. The PD 27 receives the transmitted light and the reflected light with a time difference depending on the given optical path difference.

The preamplifier 28 amplifies the transmitted light and the reflected light received at the PD 27.

The A/D converter 29 converts each of the transmitted light and the reflected light after the amplification at the preamplifier 28 into an electric signal.

The correlator 30 correlates the electric signals sent from the A/D converter 29 with the pseudo random code sent from the PN code generator 20, thereby calculating respective gains relative to the intensity of the physical measurement light depending on the intensity of the transmitted light and the intensity of the reflected light.

The shift analyzer 31 calculates a ratio of (transmission factor/reflection factor) on the basis of the gain of the transmitted light at the time of its peak and the gain of the reflected light at the time of its peak, both of which have been calculated by the correlator 30. Then, the shift analyzer 31 calculates a wavelength shift on the basis of the calculated factor ratio to detect information on the physical quantity of the measurement target object.

At each of the optical couplers 3a and 3b, an optical fiber is branched into two lines in such a manner that the energy of light that propagates through the through main line 5 is split with a predetermined ratio. In the present embodiment of the invention, light is distributed to the FBGs 4a, 4b, and 4c with equal energy.

The FBGs 4a, 4b, and 4c, which are Fiber Bragg Grating, are provided with a distance each between the FBGs 4a and 4b and between the FBGs 4b and 4c that is sufficiently larger (longer) than the distance resolving power of the measurement apparatus 2. When there is no change in the physical quantity of a measurement target object, the FBGs 4a, 4b, and 4c reflects light with the wavelength λ0 as return light. When there is a change in the physical quantity of a measurement target object, the wavelength of return light is shifted depending on the change in the physical quantity of the measurement target object.

Though the installation interval of the FBGs 4a, 4b, and 4c is arbitrary, it is not smaller than the distance resolving power that is determined depending on the chip rate of the PN code generator 20.

The distance resolving power is calculated using the following formula.

Distance Resolving Power ΔL=4×(100/fc)(m)

(where fc denotes the chip rate of the PN code generator 20, which is expressed in MHz)

For example, when the chip rate is 10 MHz, the minimum required distance each between the FBGs 4a and 4b and between the FBGs 4b and 4c is 40 m. In the present embodiment of the invention, the intensity of the physical measurement light is taken as a reference when calculating the level of transmitted light and the level of reflected light. However, the scope of the invention is not limited thereto. Any alternative reference may be used for calculating the level of transmitted light and the level of reflected light.

Next, a method for measuring the physical quantity of a measurement target object by means of the optical fiber sensing system 1 will now be explained.

The PN code generator 20 generates a pseudo random code illustrated in FIG. 2(a). The light source driver 21 is operated in response to the pseudo random code. The light source driver 21 performs PN modulation on light emitted from the broadband light source 22. Physical measurement light illustrated in FIG. 2(b) goes into the optical fiber 23a from the broadband light source 22.

Having entered the optical fiber 23a, the physical measurement light propagates through the through main line 5. The physical measurement light is split into beams at the optical couplers 3a and 3b. The beams go into the FBGs 4a, 4b, and 4c, respectively. Each of the FBGs 4a, 4b, and 4c returns reflected beam of light having a wavelength corresponding to the physical quantity of a measurement target object.

The beams coming back respectively from the FBGs 4a, 4b, and 4c go into the measurement apparatus 2 with a time difference that is determined depending on the installation interval of the FBGs 4a, 4b, and 4c.

The return light coming from the FBG 4a, which is located at a position that is the closest to the measurement apparatus 2, goes into the circulator 24a first. The light goes out from the circulator 24a to the optical fiber 23b.

Having entered the circulator 24b from the optical fiber 23b, the light goes out to the optical fiber 23c.

Thereafter, the light goes into the wavelength tilt filter 25a from the optical fiber 23c. The wavelength tilt filter 25a separates the light entering from the optical fiber 23c into transmitted light and reflected light whose intensity changes in a complementary manner in accordance with its wavelength.

The transmitted light propagates through the optical fiber 23d to be received by the PD 27. On the other hand, the reflected light propagates toward the circulator 24b and then goes into the circulator 24b. The reflected light goes out from the circulator 24b to the optical fiber 23e. The dummy fiber 26 adds thereto an optical path difference that is not smaller than the distance resolving power of the measurement apparatus 2. The PD 27 receives the reflected light coming from the dummy fiber 26.

Next, the preamplifier 28 amplifies the transmitted light and the reflected light. The A/D converter 29 converts each of the transmitted light and the reflected light after the amplification at the preamplifier 28 into an electric signal. The electric signals are sent to the correlator 30.

The electric signals sent from the A/D converter 29 are correlated with the pseudo random code sent from the PN code generator 20 at the correlator 30 to calculate the respective gains of the transmitted light and the reflected light relative to the physical measurement light. The calculated gains are outputted to the shift analyzer 31.

The shift analyzer 31 calculates a difference in decibel between the gain of the transmitted light at the time of its peak and the gain of the reflected light at the time of its peak.

A wavelength shift is calculated on the basis of the difference in decibel. Then, the physical quantity of the measurement target object is calculated on the basis of the amount of the shift.

The return light coming from each of the FBGs 4b and 4c is processed in the same manner as above. By this means, the physical quantity of the measurement target object is detected.

(Method for Calculating Wavelength Shift)

Next, with reference to a drawing, a method for calculating the amount of a wavelength shift on the basis of the difference in decibel described above will now be explained.

Figure 5:
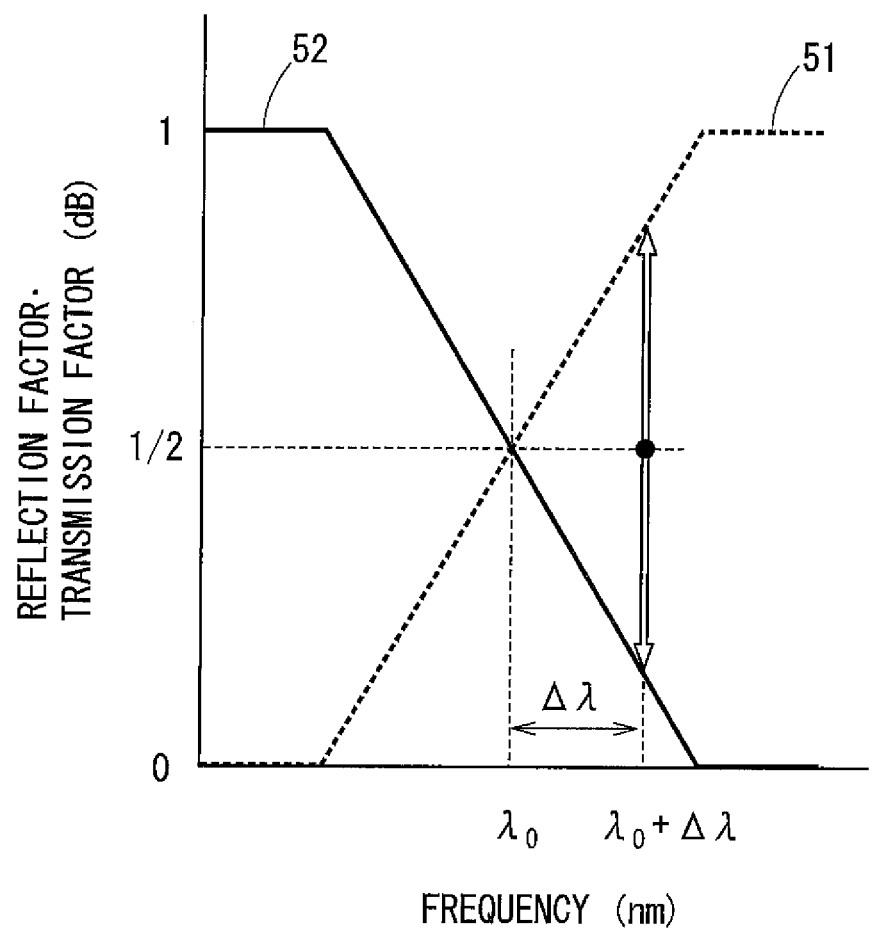
[FIG. 5]

FIG. 5 is a simplified diagram corresponding to FIG. 3. It is simplified in order to explain a method for calculating the amount of a wavelength shift. The abscissa (axis of abscissas) of FIG. 5 represents frequency (MHz). The ordinate (axis of ordinates) thereof represents transmission and reflection factors (dB).

A curve 51 indicates the transmission factor of light going into the wavelength tilt filter 25a relative to its wavelength. The transmission curve 51 can be expressed mathematically as follows.

$$t(\lambda) = \frac{1}{2} - a(\lambda - \lambda_0) \quad \text{[Formula 1]}$$

A curve 52 indicates the reflection factor of light going into the wavelength tilt filter 25a relative to its wavelength. The reflection curve 52 can be expressed mathematically as follows.

$$r(\lambda) = \frac{1}{2} + a(\lambda - \lambda_0) \quad \text{[Formula 2]}$$

As one can understand from the above two formulae, the transmission and reflection factors change complementarily;

since one of these two factors increases as the other decreases, the sum of them is always one.

The ratio of the transmission factor and the reflection factor can be expressed as follows.

$$\zeta(\lambda) = \frac{r(\lambda)}{t(\lambda)} = \frac{1 + 2a(\lambda - \lambda_0)}{1 - 2a(\lambda - \lambda_0)} \quad \text{[Formula 3]}$$

Let us assume that the physical quantity of a measurement target object changes, which causes a shift in the wavelength of a reflected beam returning from an FBG by a shift amount of $\lambda\Delta$; the consequence of the shift is expressed as $\lambda=\lambda 0+\Delta\lambda$. Under the assumption of the above shift, the following formula can be derived from the above formula expressing the ratio of the transmission factor and the reflection factor.

$$\Delta\lambda = \frac{1}{2} \cdot \frac{\zeta(\lambda_0 + \Delta\lambda) - 1}{\zeta(\lambda_0 + \Delta\lambda) + 1} \quad \text{[Formula 5]}$$

The light that has returned from the FBG is separated by means of the wavelength tilt filter 25c into transmitted light and reflected light with transmission and reflection factors in accordance with its wavelength as described above. Then, a wavelength shift is calculated on the basis of a difference in decibel between the gain of the transmitted light and the gain of the reflected light.

(Simulation)

A simulation was run with the use of the optical fiber sensing system 1 according to the present embodiment of the invention under the conditions shown in the table below.

Simulation Conditions

TABLE 1

| Items | | Values, etc. |
|---|---|---|
| Fiber Length | | 1,000 m |
| FBG | Number | 1 |
| | Reflection Factor | −10 dB |
| | $d\lambda/dT$ | 9 pm/° C. |
| Wavelength Analysis Filter | Center Wavelength | 1,536 nm (Gaussian) |
| | Half Width at Half Maximum | 5.8 nm |
| Dummy Fiber | | 100 m |
| Rayleigh Scattering Level | | −40 dB |
| Chip Rate | | 100 MHz |
| Code Length | | $2^{16} - 1$ |
| Sampling Frequency | | 100 MHz |
| Accumulate | | Not accumulated |
| Light Reception S/N | | 40 dB |

A band pass filter with a single cavity type $SiO_2/TiO_2$ multilayer film was used as the wavelength tilt filter 25a. It is configured as a Gaussian filter, the characteristics of which are shown in FIG. 6.

Figure 6:
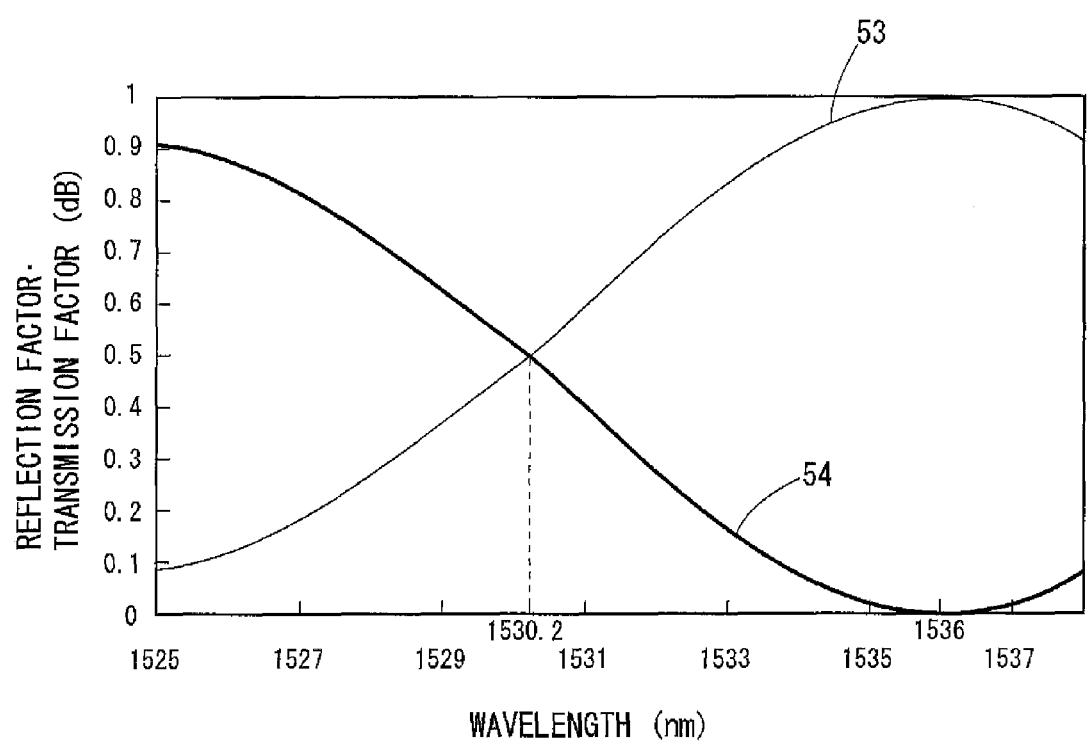
[FIG. 6]

In FIG. 6, curves 53 and 54 indicate transmission and reflection factors, respectively. The transmission factor is equal to the reflection factor at a wavelength of 1530.2 nm. The abscissa of FIG. 6 represents wavelength (nm). The ordinate thereof represents transmission and reflection factors (dB).

Figure 7A:
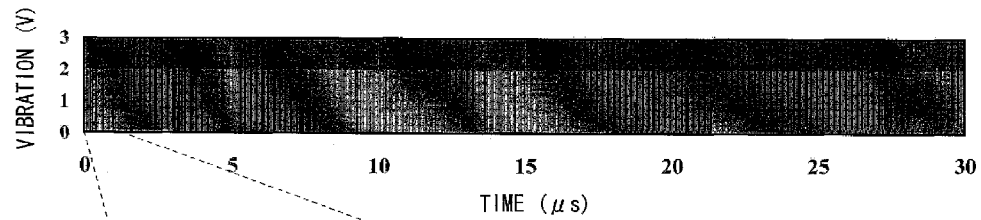
FIG. 7(a) is a diagram that illustrates light going into the optical fiber 23a from a broadband light source 22.

FIG. 7(a) is a diagram that illustrates light going into the optical fiber 23a from the broadband light source 22.

Figure 7B:
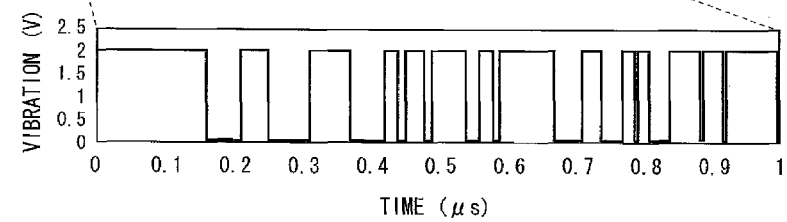
FIG. 7(b) is an enlarged view of a part of FIG. 7(a)

As illustrated in FIG. 7, it has been subjected to on-off digital modulation by means of a pseudo random code sent from the PN code generator 20. FIG. 7(b) is an enlarged view of a part of FIG. 7(a). In each of FIGS. 7(a) and 7(b), the ordinate and the abscissa represent voltage [V] and time [μs], respectively.

Figure 8A:
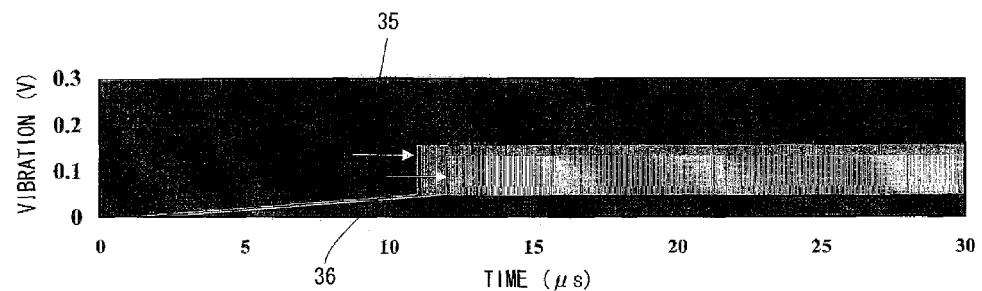
FIG. 8(a) is a diagram that illustrates the waveform of transmitted light and the waveform of reflected light after the separation of beams of light that have returned from FBGs 4a, 4b, and 4c by means of a Gaussian filter.
Figure 8B:
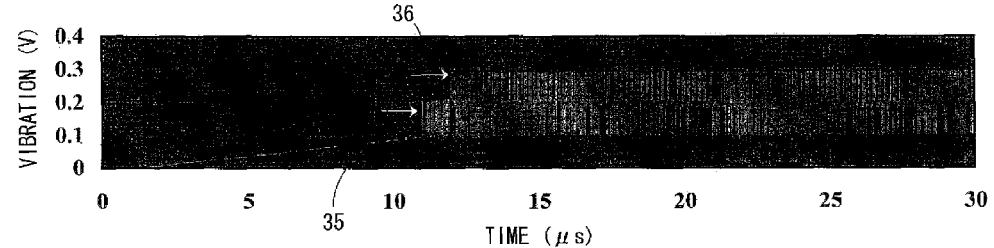
FIG. 8(b) is a diagram that illustrates a waveform after the combining of the transmitted light and the reflected light.

FIG. 8(a) is a diagram that illustrates the waveform of transmitted light and the waveform of reflected light after the separation of beams of light that have returned from the FBGs 4a, 4b, and 4c by means of the above Gaussian filter. FIG. 8(b) is a diagram that illustrates a waveform after the combining of the transmitted light and the reflected light (the waveform of the combined return light). In each of FIGS. 8(a) and 8(b), the ordinate and the abscissa represent voltage [V] and time [μs], respectively.

As illustrated in FIG. 8(a), since the dummy fiber 26 gives rise to an optical path difference (100 m) between the path of transmitted light 35 and that of reflected light 36, the rising of the reflected light 36 falls behind that of the transmitted light 35 by a delay amount corresponding to the optical path difference. The reason why it increases linearly from 11 μs to 12 μs at the outset is that the reflection distribution of Rayleigh scattering is continuous.

The PD 27 receives the above light obtained by combining the transmitted light 35 and the reflected light 36, the waveform of which (the waveform of the combined return light) is illustrated in FIG. 8(b).

Figure 9A:
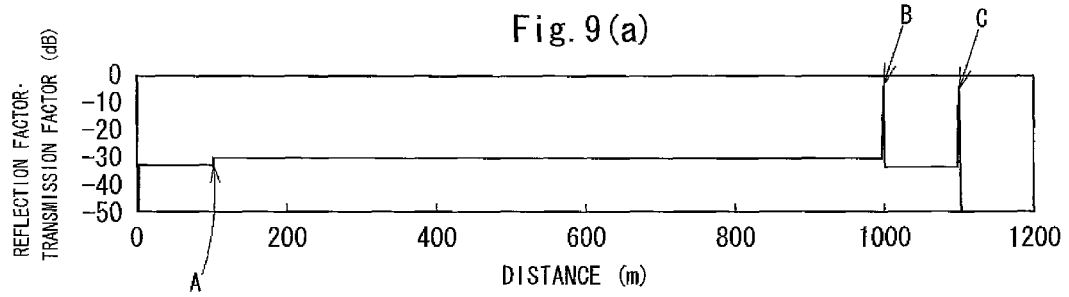
FIG. 9(a) shows a result of the cross correlation of combined return light received by a PD 27 by means of a pseudo random code generated by a PN code generator 20.

FIG. 9(a) shows a result of the cross correlation of combined return light received by the PD 27 by means of a pseudo random code generated by the PN code generator 20. The abscissa of FIG. 9(a) represents distance [m]. The ordinate thereof represents transmission and reflection factors (dB).

As illustrated in FIG. 9(a), the level of Rayleigh backscattering is raised by 3 dB at a point A in the vicinity of a 100 m point. This is because the level of the transmitted light and that of the reflected light are added to each other at the point A.

As illustrated in FIG. 9(a), the peak of the transmitted light appears at a point B (approximate to 1,000 m). The peak of the reflected light appears at a point C (approximate to 1,100 m). That is, one can understand that the peak values are detected next to each other with the optical path difference (100 m) given by the dummy fiber 26 therebetween.

The difference in decibel between these two peak values is equivalent to the ratio of transmission factor/reflection factor (t/r) that is to be found, that is, information on the physical quantity of a measurement target object. This corresponds to the reflection wavelength of an FBG.

The physical quantity of the measurement target object is found on the basis of the difference in decibel between these two peak values by using, for example, a calibration curve.

Figure 9B:
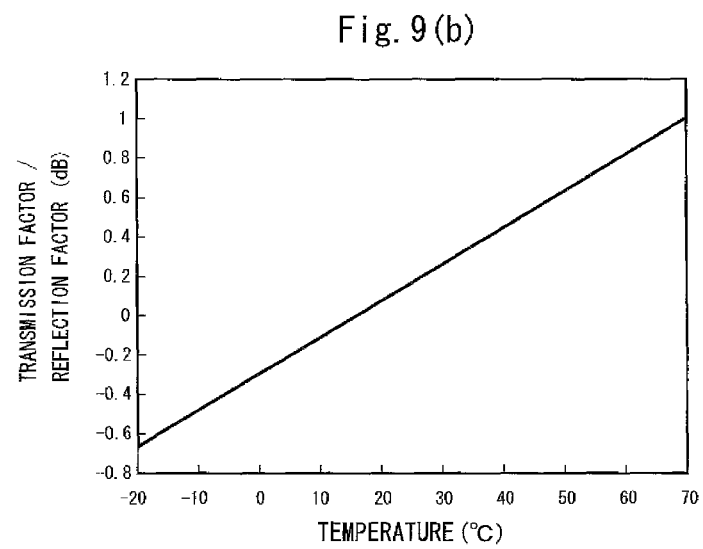
FIG. 9(b) is a diagram that illustrates a relationship between the temperature of an FBG and a detected value.

FIG. 9(b) is a diagram that illustrates, as an example, a relationship between the temperature of an FBG obtained in accordance with the above procedure and a detected value (transmission factor/reflection factor). The abscissa of FIG. 9(b) represents the FBG temperature [° C.]. The ordinate thereof represents the ratio of transmission factor/reflection factor (t/r) [dB]. As illustrated in FIG. 9(b), there is a linear relationship between the FBG temperature and the ratio of transmission factor/reflection factor. That is, the transmission and reflection factors of return light change complementarily with the sum of the transmission factor and the reflection factor being kept constant at one depending on a change in the physical quantity of the measurement target object. As illustrated in FIG. 9(b), the relationship between the physical quantity and the ratio of transmission factor/reflection factor can be expressed as a linear function.

(Example of Result of Actual Measurement)

The temperature of liquid in a container was measured experimentally with the use of an optical fiber sensing system according to the present embodiment of the invention as described below.

FIG. 10 is a diagram that illustrates a configuration for measuring the temperature of liquid in a container with the use of the optical fiber sensing system 1 according to the present embodiment of the invention.

As illustrated in FIG. 10, the system includes the measurement apparatus 2, a container 40 that is filled with water, an FBG 4a that is immersed in the water, etc.

Next, a platform, etc. will now be explained in detail.

The main specifications of the system are shown in the table below.

TABLE 2

| Items | Values, etc. |
|---|---|
| Fiber Length | 1,000 m |
| Dummy Fiber | 200 m |
| Chip Rate | 6.25 MHz |
| Code Length | $2^{21} - 1$ |
| Sampling Frequency | 50 MHz |
| Accumulate | Not accumulated |

As shown in the above table, the length of the through main line 5 is 1,000 m. A PN code generator that generates a pseudo random code having a code length of $2^{21}-1$ at a chip rate of 6.25 MHz was used as the PN code generator 20. The length of the dummy fiber 26 is 200 m.

Figure 11:
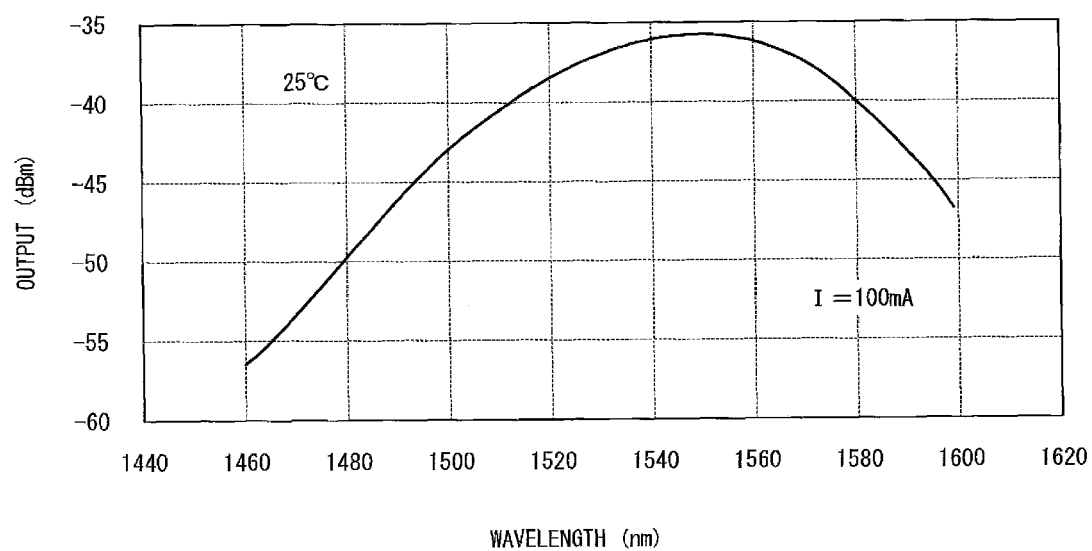
[FIG. 11]

An SLD that has the following characteristics was used as the broadband light source 22: the SLD has the light emission spectrum illustrated in FIG. 11 at a temperature of 25° C.; light emitted from the SLD can be subjected to high speed modulation; and the SLD has a continuous spectrum that includes the range of a change in the wavelength shift of the FBG 4a.

Figure 12:
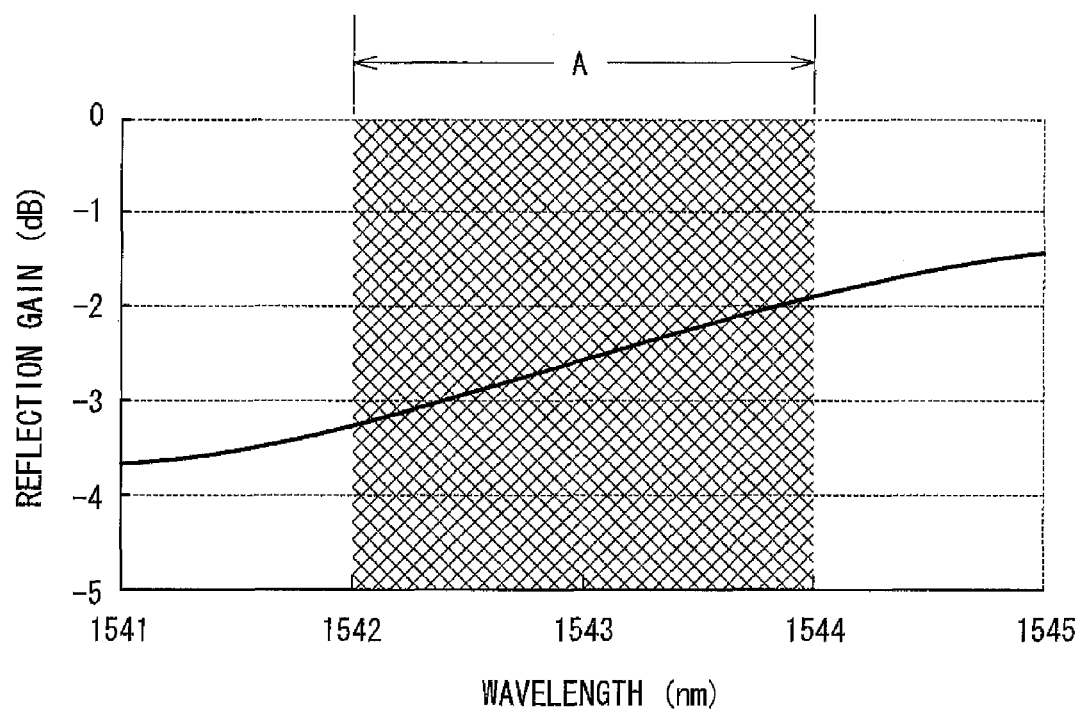
[FIG. 12]

A band pass filter that has a reflection spectrum illustrated in FIG. 12 was used as the wavelength tilt filter 25a.

In FIG. 12, a range A shows the optical range of impulse light reflected by the FBG 4a. The abscissa of FIG. 12 represents wavelength [nm]. The ordinate thereof represents reflection gain [dB]. The measurement apparatus 2 includes the temperature control mechanism 25, which keeps the temperature of the wavelength tilt filter 25a at 25° C.

Figure 13:
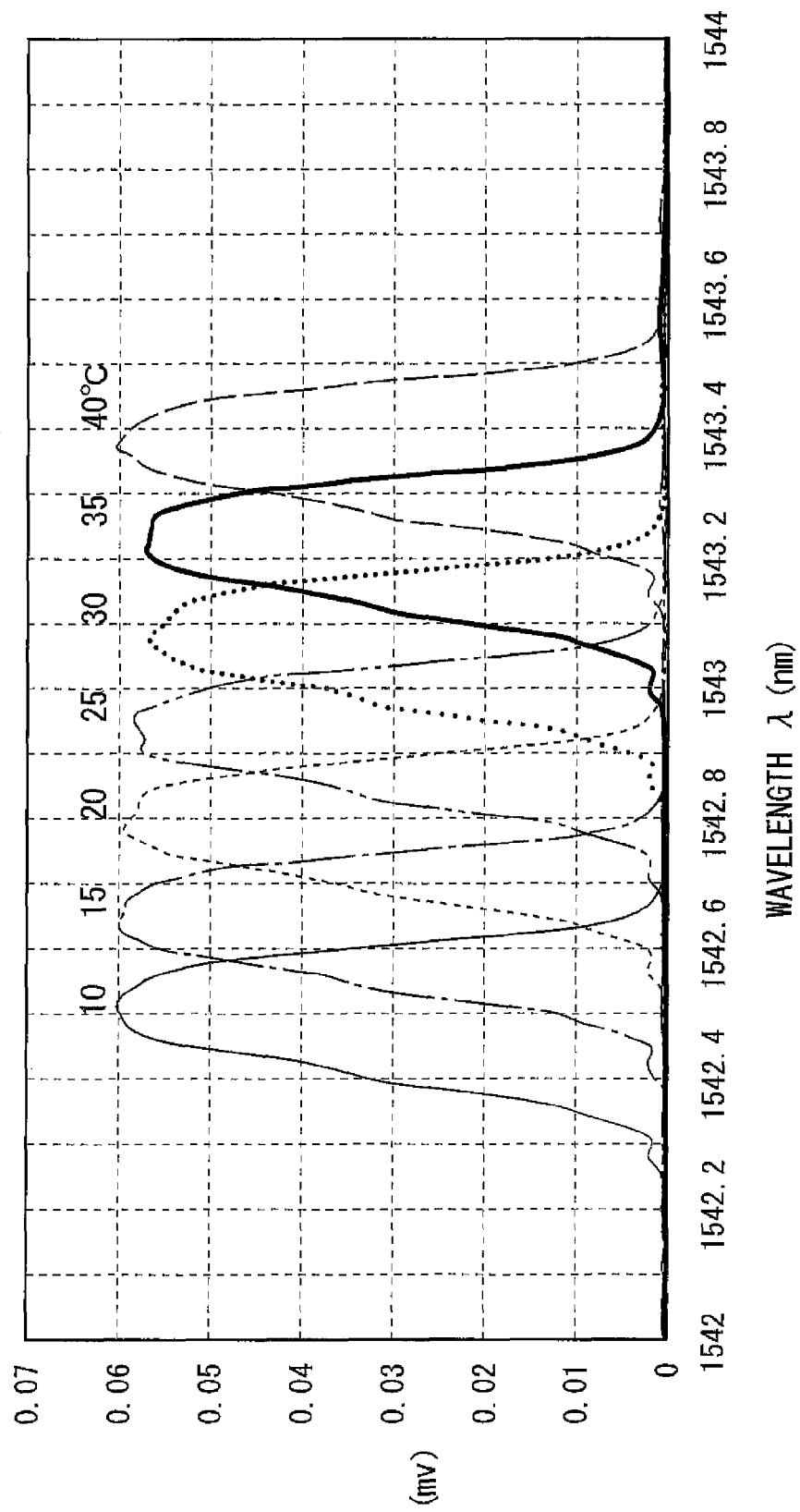
[FIG. 13]

An FBG that has temperature characteristics illustrated in FIG. 13 was used as the FBG 4a.

FIG. 13 is a diagram that illustrates a change in the wavelength of return light for given temperature. The abscissa of FIG. 13 represents wavelength [nm]. The ordinate thereof represents reflection gain relative to incident light [mW].

As illustrated in FIG. 13, the wavelength of return light coming from the FBG 4a increases as the temperature rises.

Figure 14:
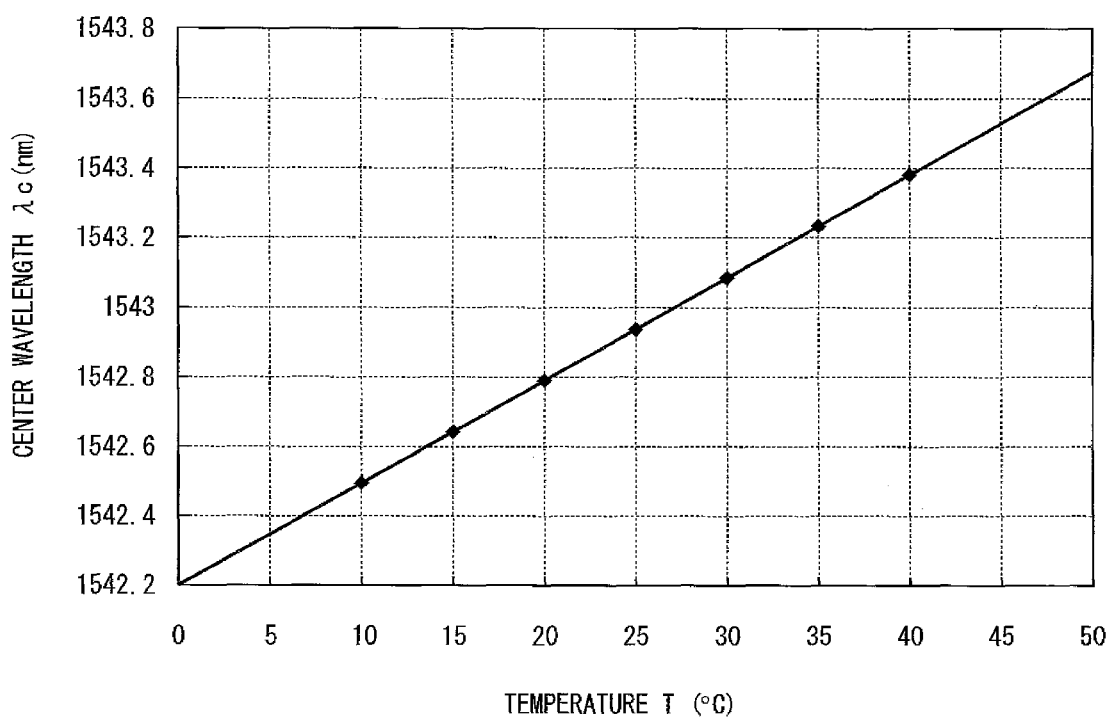
[FIG. 14]

FIG. 14 is a diagram that illustrates the temperature characteristics of center wavelength. The abscissa of FIG. 14 represents temperature [° C.]. The ordinate thereof represents center wavelength [nm]. As illustrated in FIG. 14, the relationship between temperature and center wavelength can be expressed as a linear function with a temperature coefficient of 28 pm/° C.

Figure 15:
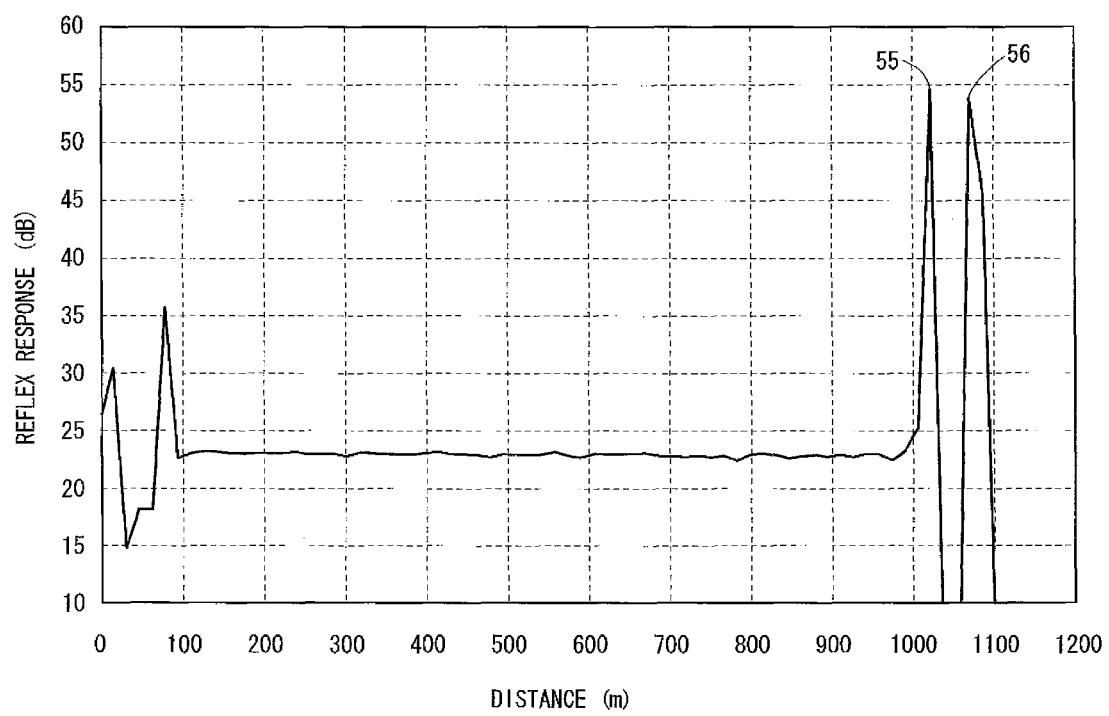
[FIG. 15]
Figure 16:
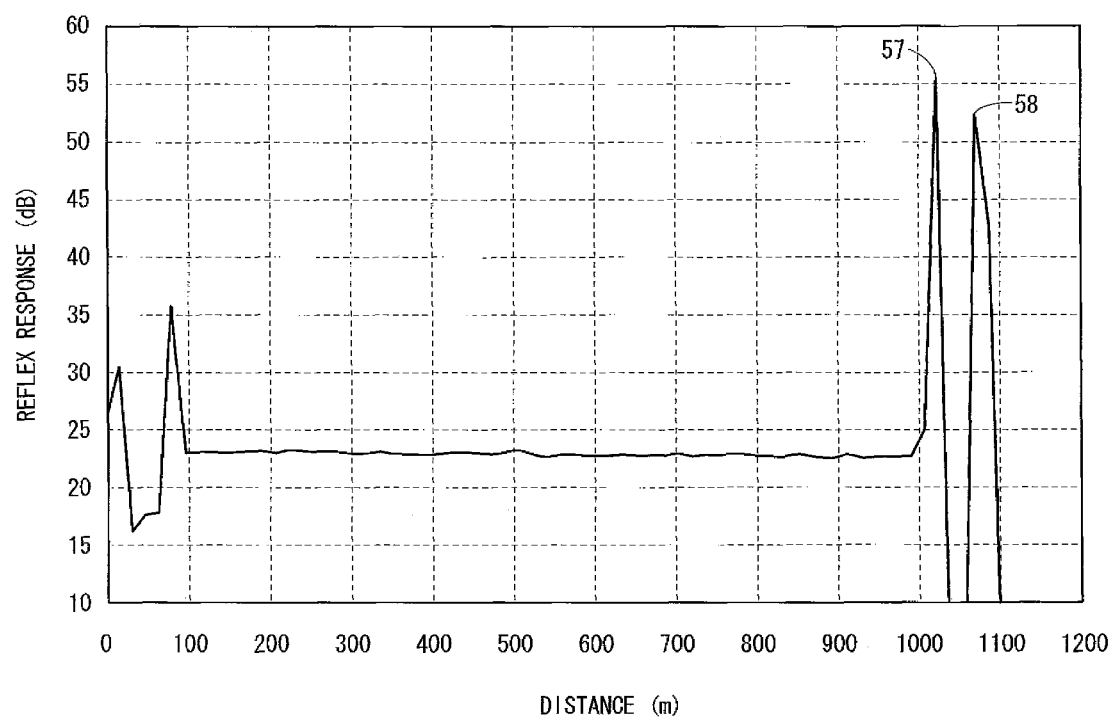
[FIG. 16]

FIG. 15 is a diagram that illustrates waveform response when the temperature of the water is 30° C. FIG. 16 is a diagram that illustrates waveform response when the temperature of the water is 56° C.

In FIG. 15, a point 55 indicates the peak of transmitted light (transmission peak), whereas a point 56 indicates the peak of reflected light (reflection peak). In FIG. 16, a point 57 indicates the peak of transmitted light, whereas a point 58 indicates the peak of reflected light.

As can be understood from FIGS. 15 and 16, the transmission peak and the reflection peak appear next to each other on a time axis; in addition, the levels of these two peaks change in a push-pull manner depending on temperature.

Figure 17:
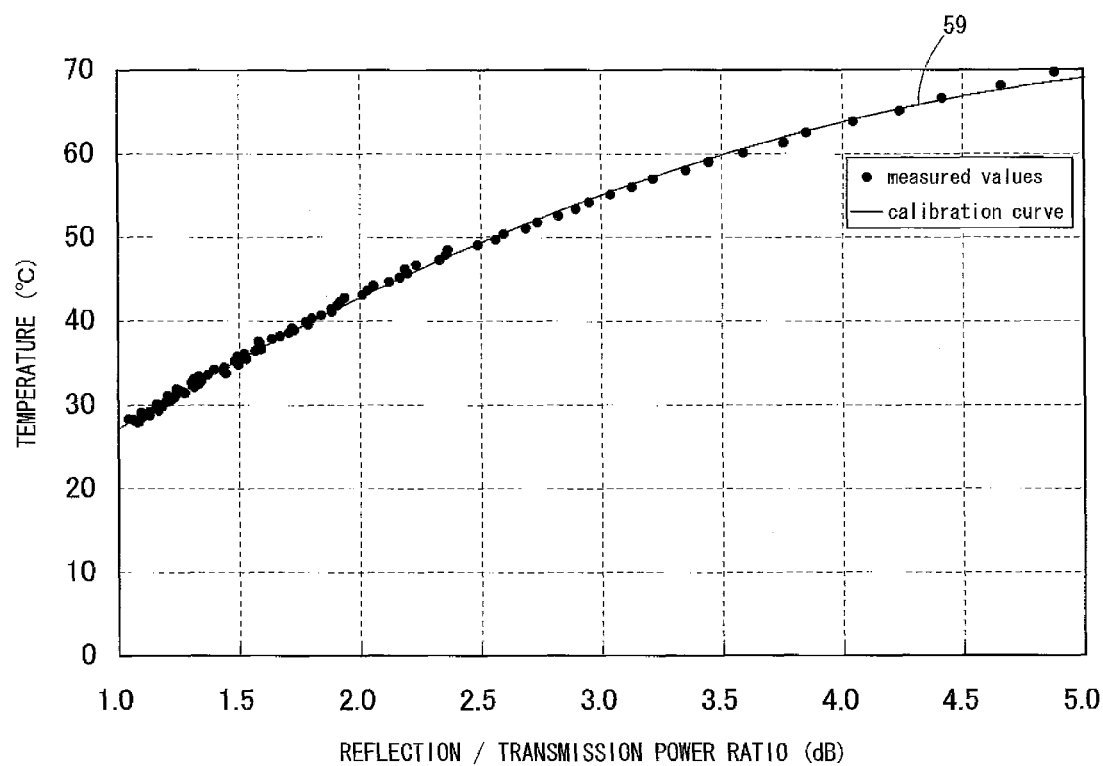
[FIG. 17]

FIG. 17 is a diagram that illustrates a calibration curve 59. The abscissa of FIG. 17 represents a difference in decibel [dB]. The ordinate thereof represents temperature [° C.]. Temperature is found on the basis of the difference in decibel with the use of the calibration curve 59. Note that points plotted therein indicate measured values.

For example, in FIG. 15, since the difference between the reflex response of the transmission peak and the reflex response of the reflection peak is approximately 1.1, the temperature of the liquid in the container is found to be 30° C. as indicated by the calibration curve 59.

In FIG. 16, since the difference between the reflex response of the transmission peak and the reflex response of the reflection peak is approximately 3.4, the temperature of the liquid in the container is found to be 56° C. as indicated by the calibration curve 59.

Figure 18:
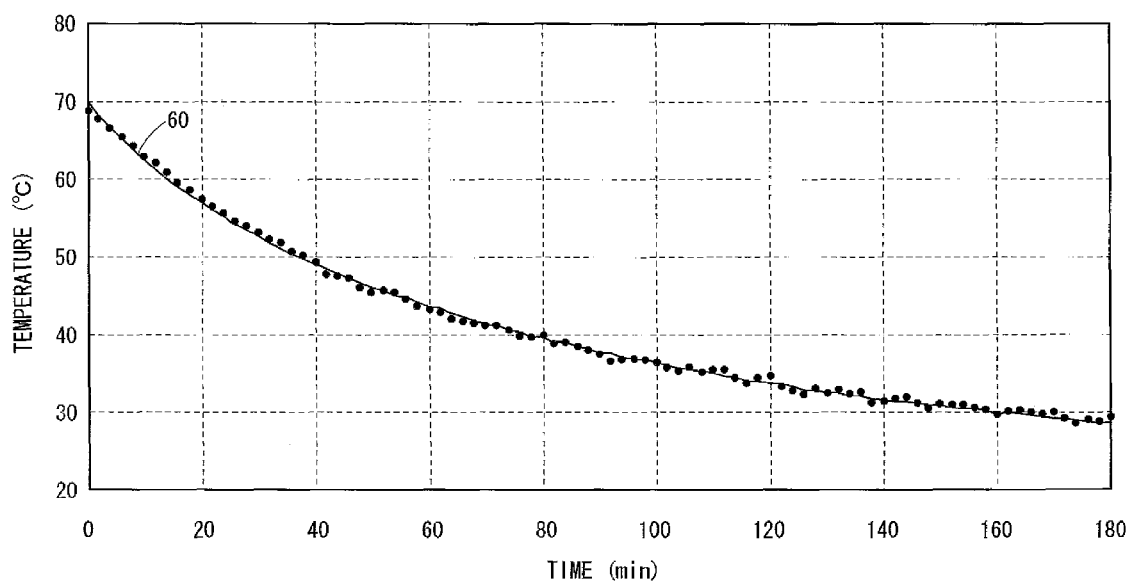
[FIG. 18]

FIG. 18 is a diagram that shows the result of measurement carried out under the following conditions: a container was filled with hot water with a temperature of 70° C.; the FBG 4a and a thermometer were immersed in the hot water; the container with the hot water was left to stand for natural cooling. The abscissa of FIG. 18 represents time [min]. The ordinate thereof represents temperature [T].

A solid curve 60 shown in FIG. 18 corresponds to temperature values indicated by the thermometer. Points plotted therein indicate values measured with the use of the FBG 4a.

As illustrated in FIG. 18, the values measured with the use of the FBG 4a are a close approximation to the actual values of temperature indicated by the thermometer.

Figure 19:
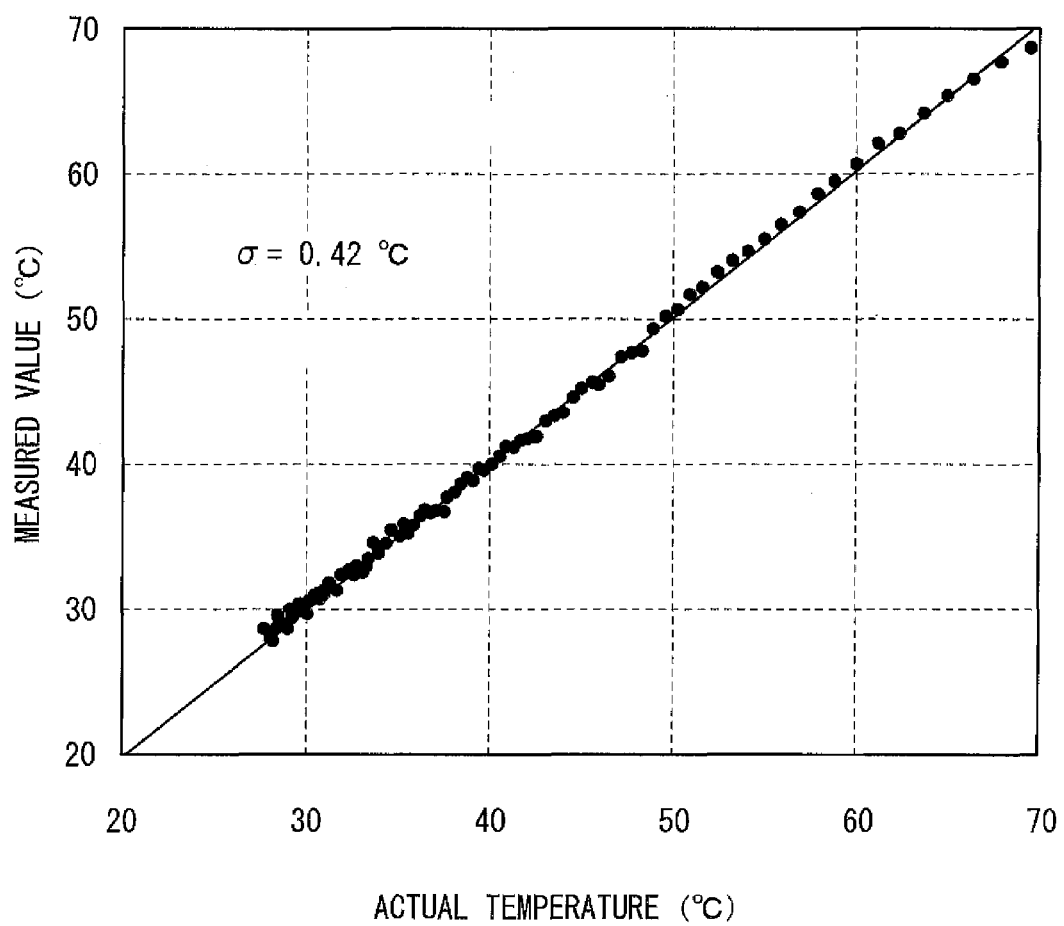
[FIG. 19]

FIG. 19 is a diagram that illustrates correlation between the temperature values indicated by the thermometer and the measured values. The abscissa of FIG. 19 represents actual temperature [° C.]. The ordinate thereof represents measured values [° C.].

As illustrated in FIG. 19, there is correlation therebetween with a high degree of linearity (standard deviation: 0.34), which substantiates that the values were measured with high precision.

Figure 20:
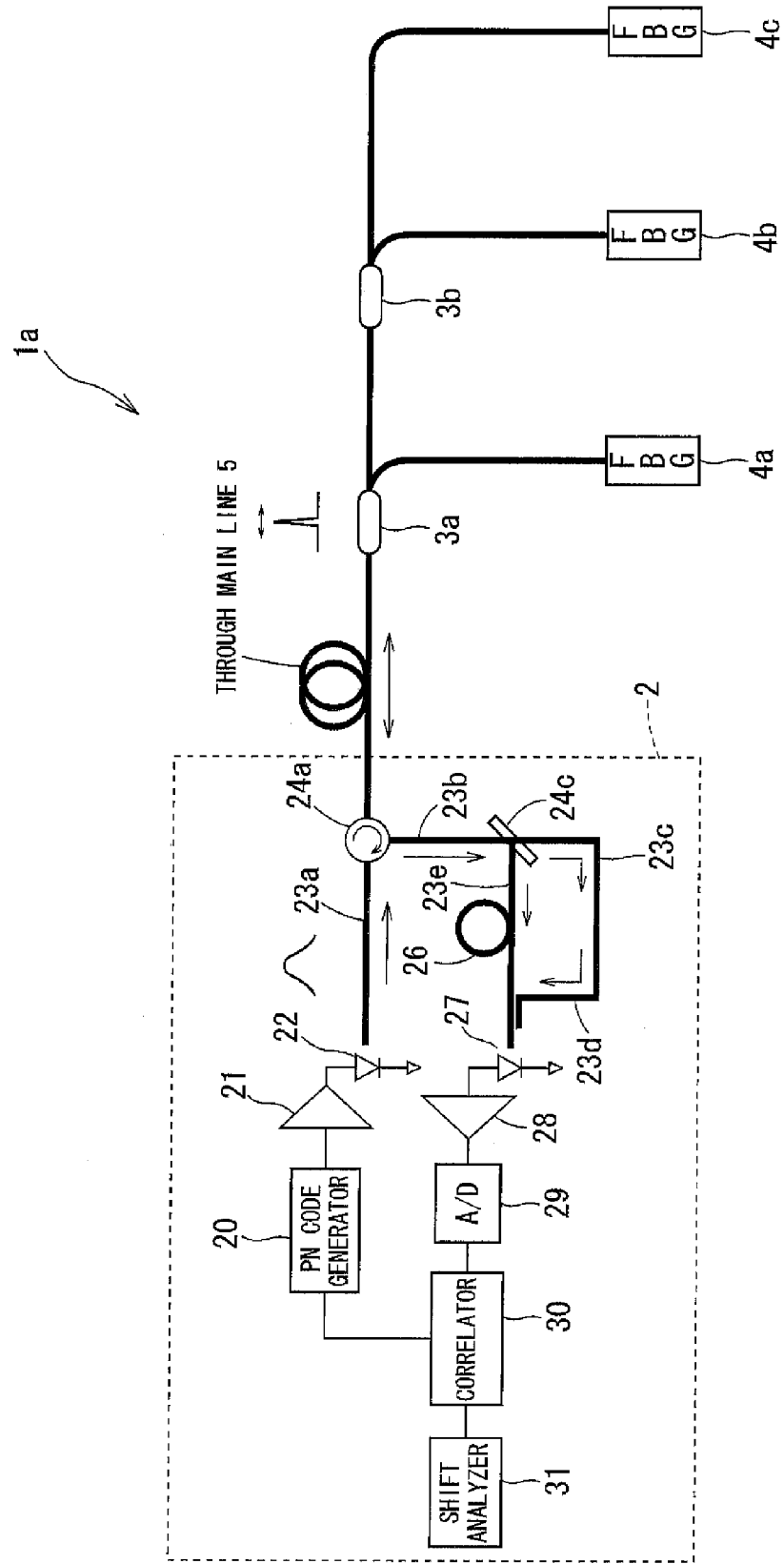
[FIG. 20]

In the above optical fiber sensing system, a combination of the circulator 24b and the wavelength tilt filter 25a is adopted as the light separating means. However, the scope of the invention is not limited to such an exemplary configuration. For example, a filter 24c may be used as the light separating means as illustrated in FIG. 20. With such a modified configuration, since light can be separated into transmitted light and reflected light by means of the filter 24c only, as compared with an exemplary configuration in which the light separating means includes a circulator, it is possible to manufacture an optical fiber sensing system at lower cost. The filter 24c is oriented obliquely at an angle of 45° with respect to the optical fiber 23b.

Next, with reference to a drawing, an improved version of the optical fiber sensing system described above will now be explained.

In the optical fiber sensing system described above, in some cases, the transmission loss of the optical fiber 23d, which is the optical path of transmitted light, and the transmission loss of the optical fibers 23c and 23e, which make up the optical path of reflected light, fluctuate depending on temperature, humidity, and the like. In such a case, there is a risk of a significant error in the result of measurement.

An optical fiber sensing system described below can prevent the result of measurement from being affected by fluctuations in the transmission loss of the optical path of transmitted light and the transmission loss of the optical path of reflected light.

Figure 21:
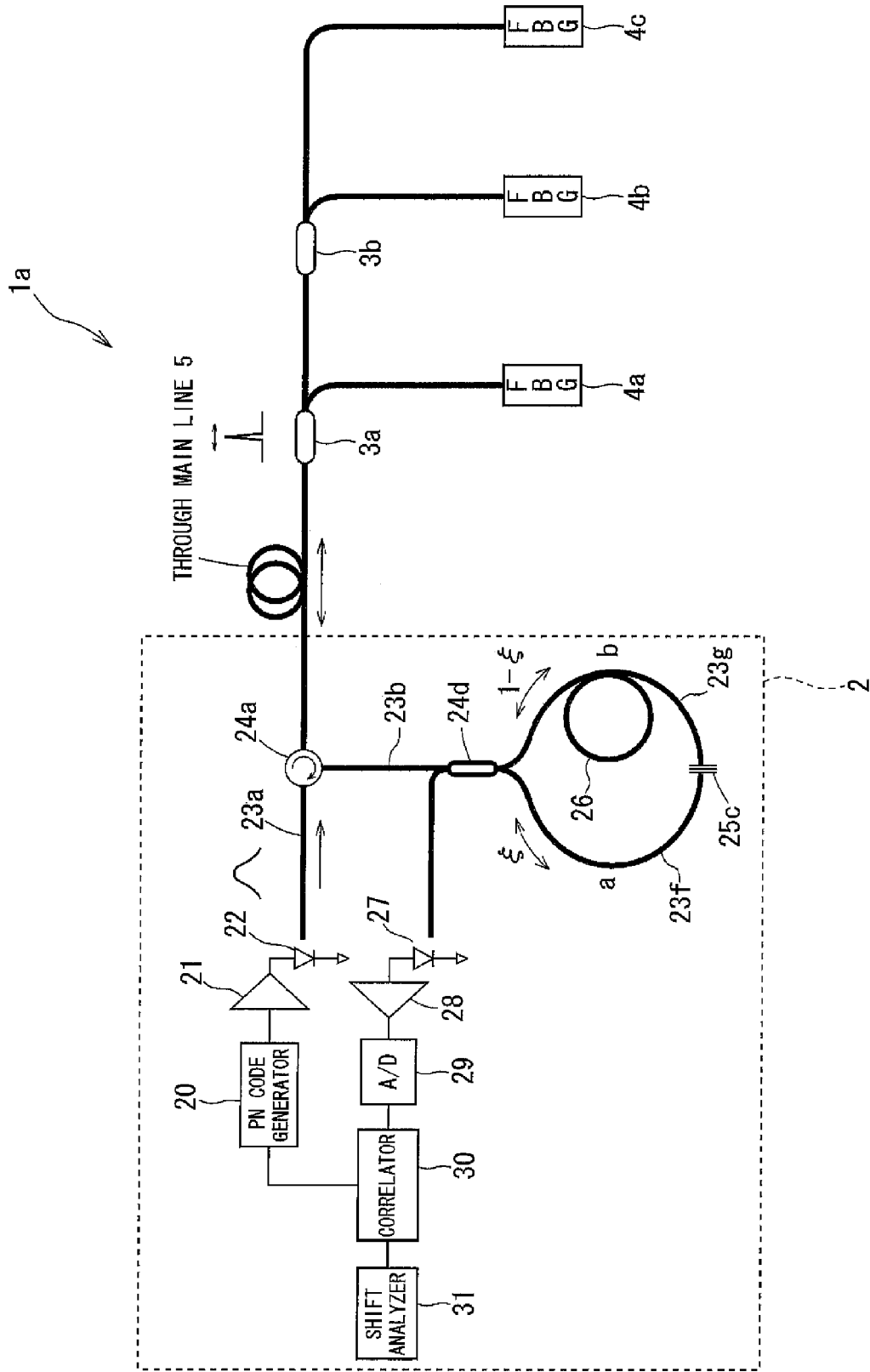
[FIG. 21]

FIG. 21 is a diagram that illustrates the overall configuration of an improved optical fiber sensing system $1a$.

In the following description, the same reference numerals are assigned to constituent elements that are the same as those of the optical fiber sensing system 1. The same constituent elements will not be explained in detail.

As illustrated in FIG. 21, the optical fiber sensing system $1a$ includes an optical coupler 24d for splitting return light coming from the FBG 4a, 4b, 4c with a bifurcation ratio of $\zeta:1-\zeta$, the dummy fiber 26 having a fiber length L, a tilt filter 25c, etc. The transmission loss factor of one optical path 23f is denoted as "a". The transmission loss factor of the other optical path 23g is denoted as "b". The tilt filter 25c may be a filter with a dielectric multilayer film. Alternatively, the tilt filter 25c may be a broadband FBG.

Next, the propagation of return light from the FBG will now be explained.

Return light coming from the FBG goes into the circulator 24a. The light goes out from the circulator 24a to the optical fiber 23b. Then, the light goes into the optical coupler 24d.

The return light that has entered the optical coupler 24d is split onto the optical paths 23f and 23g, which bifurcate from the optical fiber 23b at the optical coupler 24d, with the bifurcation ratio of $\xi:1-\xi$.

Light going out from the optical coupler 24d to the optical path 23f goes into the tilt filter 25c. The light is separated at the tilt filter 25c into first transmitted light and first reflected light with the ratio of t:r. The first reflected light goes out from the tilt filter 25c to the optical path 23f. The first transmitted light goes out from the tilt filter 25c to the optical path 23g.

On the other hand, light going out from the optical coupler 24d to the optical path 23g propagates through the dummy fiber 26. Thereafter, the light goes into the tilt filter 25c. The light is separated at the tilt filter 25c into second transmitted light and second reflected light with the ratio of t:r. The second transmitted light goes out from the tilt filter 25c to the optical path 23f. The second reflected light goes out from the tilt filter 25c to the optical path 23g.

Next, the intensity of each of the above beams is calculated. Herein, it is assumed that the intensity of the return light coming from the FBG is 1.

The intensity of the first reflected light, which is denoted as $R_1$, can be expressed by the following formula.

$$R_1 = \xi^2 a^2 r \quad \text{[Formula 6]}$$

The PD 27 receives the light having the above intensity.

The first transmitted light and the second transmitted light are optically multiplexed at the optical coupler 24d. The intensity of the combined light, which is denoted as $R_2$, can be expressed by the following formula.

$$R_2 = 2\xi(1-\xi)abt \quad \text{[Formula 7]}$$

The PD 27 receives the light having the above intensity.

The intensity of the second reflected light, which is denoted as $R_3$, can be expressed by the following formula.

$$R_3 = (1-\xi)^2 b^2 \quad \text{[Formula 8]}$$

The PD 27 receives the light having the above intensity.

Since the length of the dummy fiber 26 is L, the relative distance of the first reflected light, the combination of the first transmitted light and the second transmitted light, and the second reflected light is L, 2L when the first reflected light is taken as a reference (0).

Next, calculation amount is defined as follows.

$$\zeta^2 = \frac{R_2^2}{4R_1 R_3} \quad \text{[Formula 9]}$$

The following formula can be derived when $R_1$, $R_2$, and $R_3$ are substituted into the above formula.

$$\zeta^2 = \frac{4\xi^2(1-\xi)^2 a^2 b^2}{4\xi^2(1-\xi)^2 a^2 b^2} \frac{t^2}{r^2} = \frac{t^2}{r^2} \quad \text{[Formula 10]}$$

id est $$\zeta = \frac{t}{r} \quad \text{[Formula 11]}$$

Since the transmission loss factors a and b cancel each other as shown in the above formula, the intensity of the light received by the PD 27 simply corresponds to the ratio of the transmission factor of the tilt filter 25a and the reflection factor thereof.

It is the shift analyzer 31 that performs the above calculation.

With the above configuration, even when the transmission loss factor of the optical path of transmitted light and the transmission loss factor of the optical path of reflected light change depending on temperature, humidity, and the like, it is possible to carry out measurement with high precision without being affected by the change.

Though an FBG is used as a reflective sensor in the present embodiment, the scope of the invention is not limited to such an exemplary configuration. An alternative reflective sensor other than an FBG, for example, Fiber Fabry-Perot Etalon that is a narrowband transmission filter or a narrowband reflection filter may be used as the reflective sensor.

Alternatively, the reflective sensor may be a narrowband multilayer reflection filter formed by vapor-depositing such a film on an end face of an optical fiber.

Next, a second embodiment of the present invention will now be explained with reference to drawings.

Figure 22:
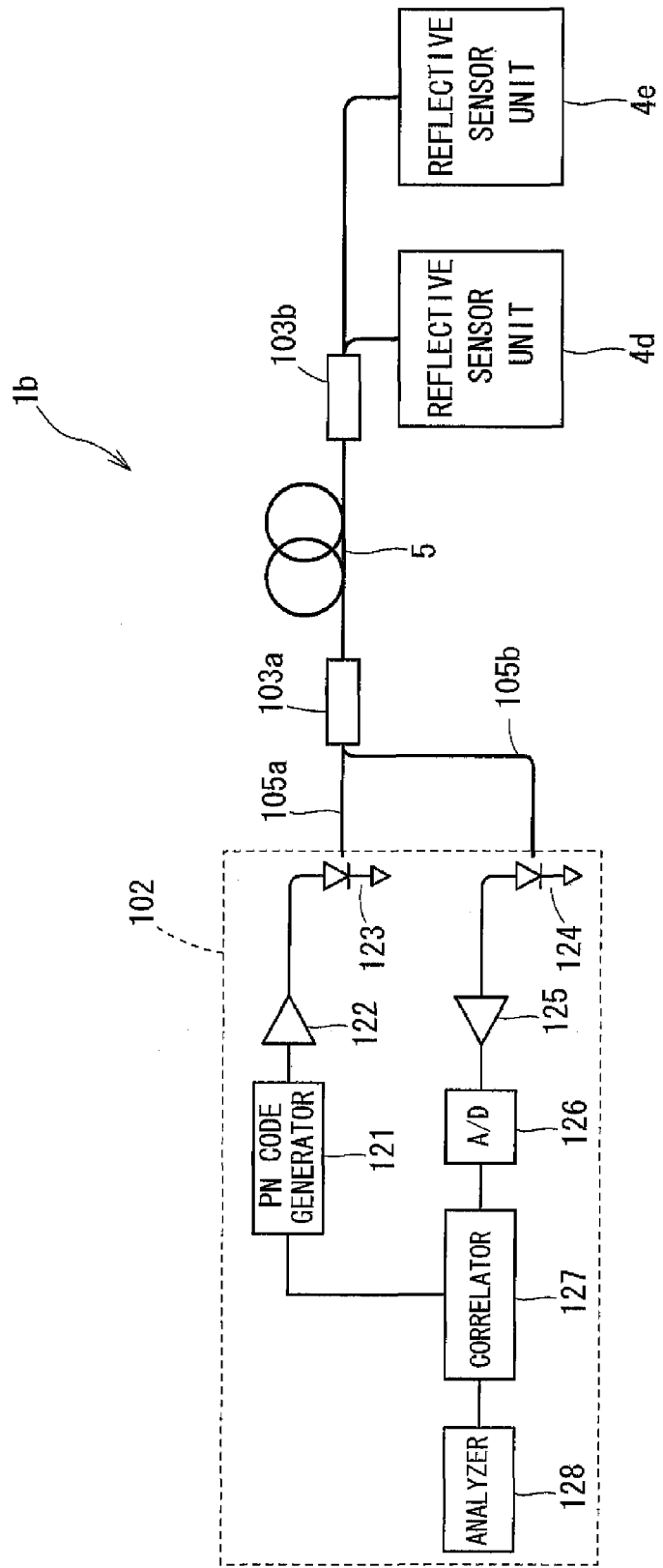
[FIG. 22]
Figure 23:
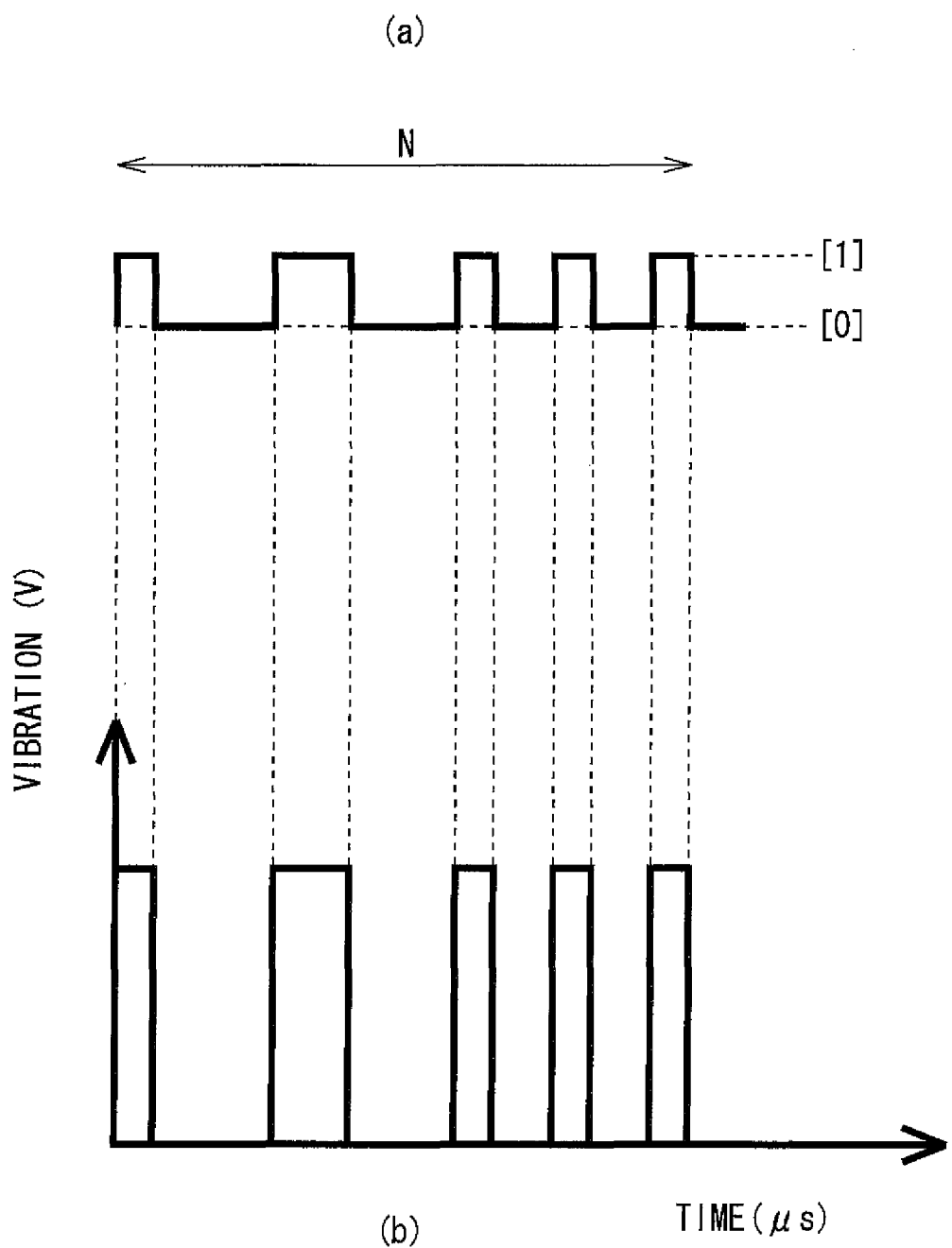
[FIG. 23]

FIG. 22 is a diagram that illustrates the configuration of an optical fiber sensing system $1b$ according to the second embodiment of the present invention.

As illustrated in FIG. 22, the optical fiber sensing system $1b$ includes a measurement apparatus 102, a circulator 103a, an optical coupler 103b, and reflective sensor units 4d and 4e, etc. Each of the reflective sensor units 4d and 4e separates light that has entered an optical fiber into two beams of light, that is, transmitted light and reflected light whose intensity changes in accordance with a change in the physical quantity of a measurement target object, and returns the beams.

The circulator 103a and the optical coupler 103b are inserted on the through main line 5. The reflective sensor unit 4d is connected to the end of a branch line, which branches at the optical coupler 103b from the through main line 5. The reflective sensor unit 4e is connected to the end of the through main line 5.

The measurement apparatus 102 includes a PN code generator 121, a light source driver 122, a broadband light source 123, a photodiode (PD) 124, a preamplifier 125, an analog-to-digital (A/D) converter 126, a correlator 127, and an analyzer 128, etc.

The PN code generator 121 generates an M-sequence pseudo random code having a code length of N (hereinafter referred to as "pseudo random code"), which is illustrated in FIG. 2(a), at a predetermined chip rate and sends a pseudo random signal to the light source driver 122 and the correlator 127.

As the length of a pseudo random code increases, the occurrence probability of 0 becomes more equal to that of 1 for approximation to random distributions, which makes it possible to generate a code with high precision. In addition, it is possible to measure return light having a low reflection level (e.g., Rayleigh scattering) with high precision by increasing the length of a pseudo random code and thereby increasing a correlation gain.

For example, when the reflection gain of Rayleigh scattering is −60 dB, it is possible to carry out measurement with high precision by setting the length of a code at $N=2^{21}-1$ (which corresponds to a gain of 63 dB) or greater. Though an M-sequence pseudo random code is used in the present embodiment, the scope of the present invention is not limited thereto. Other pseudo random codes, for example, a Gold sequence pseudo random code, may be used.

Driven by means of a pseudo random code sent from the PN code generator 121, the light source driver 122 performs PN modulation on light emitted from the broadband light source 123 on the basis of the pseudo random code For example, a Fabry-Perot laser diode, a DFB laser diode, or a super-luminescent diode (SLD) can be used as the broadband light source 123. A beam of light emitted from the laser diode is subjected to PN modulation with the use of the pseudo random code (light after the PN modulation will hereinafter be referred to as "physical measurement light"). The physical measurement light enters an optical fiber 105a.

For example, when the PN code generator 121 generates a pseudo random code having the N code length illustrated in FIG. 2(a), physical measurement light illustrated in FIG. 2(b) goes into the optical fiber 105a from the broadband light source 123.

The PD 124 receives the transmitted light and the reflected light coming from the reflective sensor units 4d and 4e.

The preamplifier 125 amplifies a transmitted light signal and a reflected light signal received at the PD 124.

After the amplification at the preamplifier 125, the A/D converter 126 converts the transmitted light signal and the reflected light signal, each of which is an analog signal, into digital signals.

The correlator 127 correlates each of the electric signals sent from the A/D converter 126 with the pseudo random code sent from the PN code generator 121 to calculate a gain relative to the physical measurement light as the level of the transmitted/reflected light.

The analyzer 128 calculates a ratio of the gain of the transmitted light and the gain of the reflected light (a difference in decibel), both of which have been calculated by the correlator 127. On the basis of the ratio (the difference in decibel), the analyzer 128 detects information on the physical quantity of a measurement target object. In the present embodiment of the invention, the intensity of the physical measurement light is taken as a reference when calculating the level of transmitted light and the level of reflected light. However, the scope of the invention is not limited thereto. Any alternative reference may be used for calculating the level of transmitted light and the level of reflected light.

The circulator 103a outputs physical measurement light coming from the optical fiber 105a to the through main line 5 and outputs light coming from the through main line 5 to an optical fiber 105b.

At the optical coupler 103b, the optical fiber is branched into two lines in such a manner that the energy of light that propagates through the through main line 5 is split with an equal ratio.

Each of the reflective sensor units 4d and 4e separates the physical measurement light coming from the measurement apparatus 102 into two beams of light, that is, transmitted light and reflected light whose intensity changes in accordance with a change in the physical quantity of a measurement target object. Equipped with a dummy fiber that adds thereto an optical path difference that is not smaller than the distance resolving power of the measurement apparatus 102, each of the reflective sensor units 4d and 4e returns the beams after the addition of the optical path difference thereto.

The reflective sensor unit 4e is provided at a distance from the reflective sensor unit 4d. The distance is sufficiently larger than the length of the dummy fiber of the reflective sensor unit 4d.

The minimum length of the dummy fiber is calculated using the following formula.

Minimum Dummy Fiber Length $L=4\times(100/fc)(m)$ (where fc denotes the chip rate of the PN code generator 121, which is expressed in MHz)

For example, when the chip rate is 10 MHz, a distance of 40 m or larger between the reflective sensor units 4d and 4e suffices. The configuration, etc., of a reflective sensor unit will be explained later.

Next, a method for measuring the physical quantity of a measurement target object by means of the optical fiber sensing system 1b will now be explained.

The PN code generator 121 generates a pseudo random code illustrated in FIG. 2(a). The light source driver 122 is operated in response to the pseudo random code. The light source driver 122 performs PN modulation on light emitted from the broadband light source 123. Physical measurement light illustrated in FIG. 2(b) goes into the optical fiber 105a from the broadband light source 123.

Having entered the optical fiber 105a, the physical measurement light propagates through the through main line 5. The physical measurement light is split into beams at the optical coupler 103b. The beams go into the reflective sensor units 4d and 4e, respectively. Each of the reflective sensor units 4d and 4e separates the incoming beam into two beams of light, that is, transmitted light and reflected light, and returns the beams after the addition of an optical path difference that is not smaller than the distance resolving power of the measurement apparatus 102 thereto.

The transmitted and reflected light coming back from each of the reflective sensor units 4d and 4e goes into the measurement apparatus 102 with a time difference that is determined depending on the installation distance between the reflective sensor units 4d and 4e.

The transmitted and reflected light coming back from the reflective sensor unit 4d, which is located at a position that is closer to the measurement apparatus 102, goes into the circulator 103a before the other. The light goes out from the circulator 103a to the optical fiber 105b. Then, the PD 124 receives the light.

Next, the transmitted and reflected light coming back from the reflective sensor unit 4e goes into the circulator 103a. The light goes out from the circulator 103a to the optical fiber 105b, followed by photo detection at the PD 124.

Next, the preamplifier 125 amplifies the photo-detected signals of each of the transmitted and reflected light coming back from the reflective sensor unit 4d and the transmitted and reflected light coming back from the reflective sensor unit 4e. The A/D converter 126 converts the analog signals into digital data. The digital data are sent to the correlator 127.

The digital data sent from the A/D converter 126 are correlated with the pseudo random code sent from the PN code generator 121 at the correlator 127 to calculate the respective gains of the transmitted light and the reflected light relative to the physical measurement light. The calculated gains are outputted to the analyzer 128.

The analyzer 128 calculates a ratio of the gain of the transmitted light at the time of its peak and the gain of the reflected light at the time of its peak (a difference in decibel). On the basis of the ratio, the analyzer 128 detects information on the physical quantity of a measurement target object.

EXAMPLE 1

Next, as a specific example of a reflective sensor unit, a position change sensor unit 130 that is used for detecting a change in position (shift, displacement) as information on the physical quantity of a measurement target object will now be explained.

Figure 24:
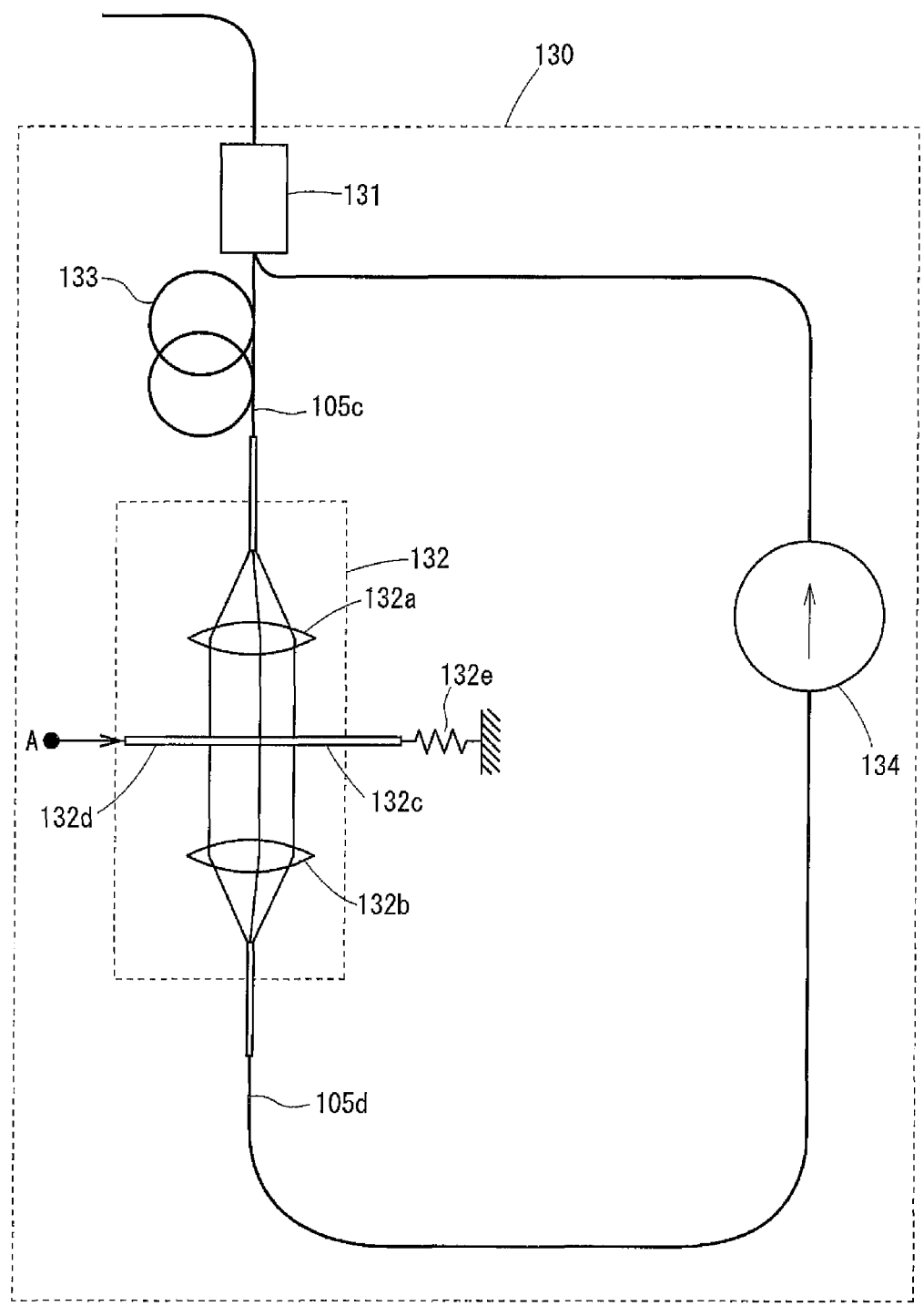
[FIG. 24]

FIG. 24 is a diagram that illustrates the configuration of the position change sensor unit 130.

As illustrated in FIG. 24, the position change sensor unit 130 includes an optical coupler 131, an optical fiber collimating system 132, a dummy fiber 133, an isolator 134, etc.

The optical fiber collimating system 132 includes lenses 132a and 132b, which are aspherical opposed lenses (or rod opposed lenses), a transparent plate 132c, which is made of a borosilicate crown optical glass, a reflector plate 132d, which is made of a borosilicate crown optical glass with gold vapor deposition (or multilayer vapor deposition), etc. The transparent plate 132c and the reflector plate 132d are oriented perpendicular to the direction of incidence of light.

An edge of the transparent plate 132c is fixed to, for example, the external wall of the position change sensor unit 130 by means of a spring 132e. A force is applied to the reflector plate 132d in "A" direction when the physical quantity of a measurement target object changes. The position of the reflector plate 132d changes due to the force applied thereto. The position of the transparent plate 132c changes when the displacement of the reflector plate 132d occurs.

The dummy fiber 133 gives rise to an optical path difference between the path of a transmitted beam and that of a reflected beam that have been separated from each other by the optical fiber collimating system 132. The optical path difference is not smaller than the distance resolving power of the measurement apparatus 102.

Though the length of the dummy fiber 133 is arbitrary, it is not smaller than a distance resolving power multiplied by four. The distance resolving power is determined depending on the chip rate of the PN code generator 121.

The minimum length of the dummy fiber is calculated using the following formula.

Minimum Dummy Fiber Length $L=4\times(100/fc)(m)$ (where fc denotes the chip rate of the PN code generator 121, which is expressed in MHz)

For example, when the chip rate is 10 MHz, the minimum required length of the dummy fiber 133 is 40 m.

The isolator 134 allows light coming from the optical fiber collimating system 132 to pass therethrough toward the optical coupler 131. The isolator 134 does not allow light coming from the optical coupler 131 to pass therethrough toward the optical fiber collimating system 132.

Next, the movement of the plates of the position change sensor unit 130 will now be explained.

Figure 25:
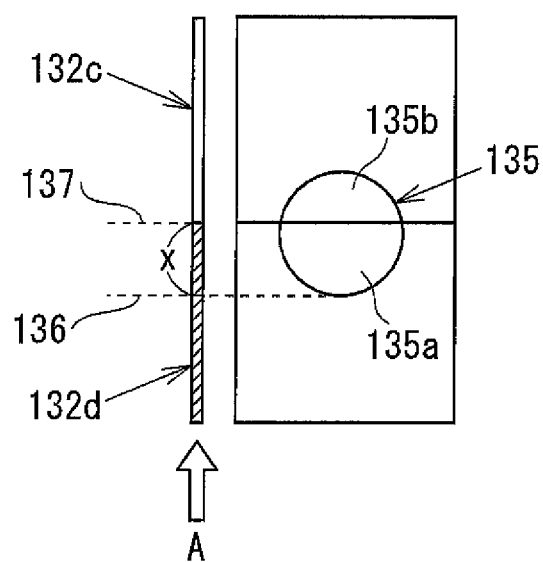
[FIG. 25]

FIG. 25 is a sectional view of the optical fiber collimating system 132 taken along the reflector plate 132d perpendicularly to the direction of incidence of light.

When a force is applied to the reflector plate 132d in the A direction to cause a change in the position of the reflector plate 132d from a position 136 to a position 137 (the amount of displacement is denoted as x), a reflection part 135a of physical measurement light (incident light) 135, which is a beam part reflected by the reflector plate 132d, increases, whereas a transmission part 135b of the physical measurement light 135, which is a beam part that passes through the transparent plate 132c, decreases. In other words, the intensity of the reflected light increases, whereas the intensity of the transmitted light decreases.

Figure 26A:
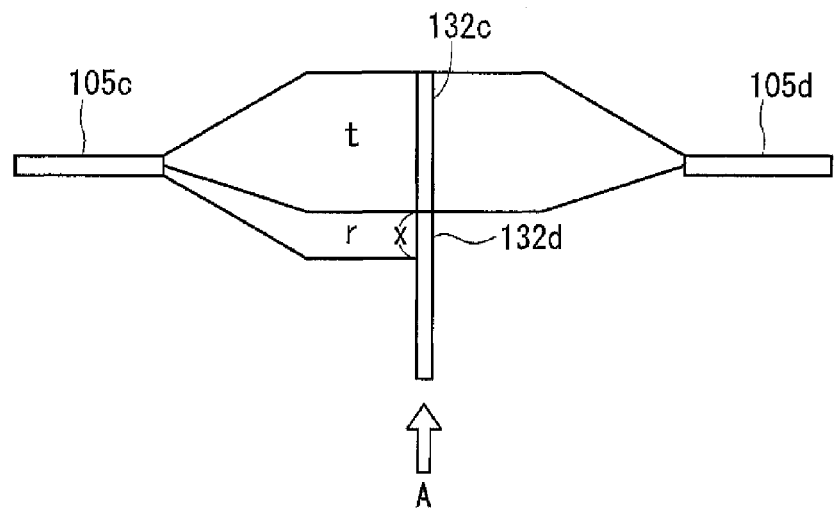
[FIG. 26] FIG. 26(a), (b), (c) is a diagram that illustrates the position of a transparent plate and a reflector plate relative to displacement applied and further illustrates the intensity of transmitted light and reflected light.

FIGS. 26(a), (b), and (c) are diagrams that illustrate a relationship between a change in the position of the reflector plate 132d and varying transmission and reflection factors when the magnitude of a force applied in the A direction is changed. The magnitude of the force applied in the A direction has the following relationship: FIG. 26(a)<FIG. 26(b) <FIG. 26(c).

Figure 26B:
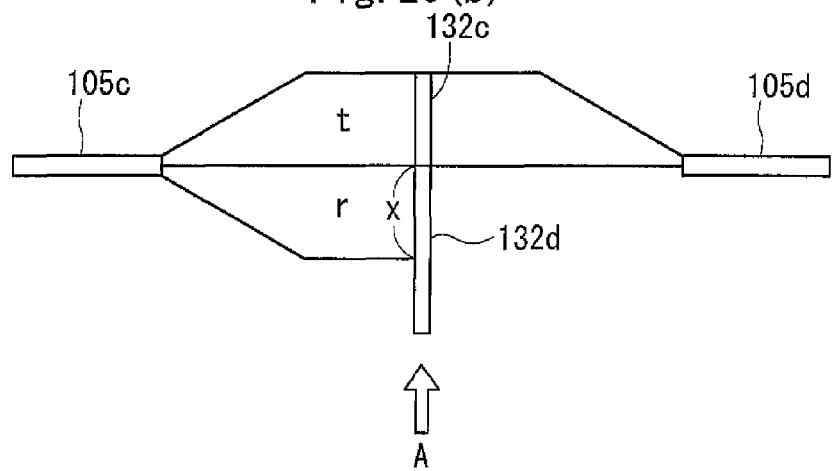
Figure 26C:
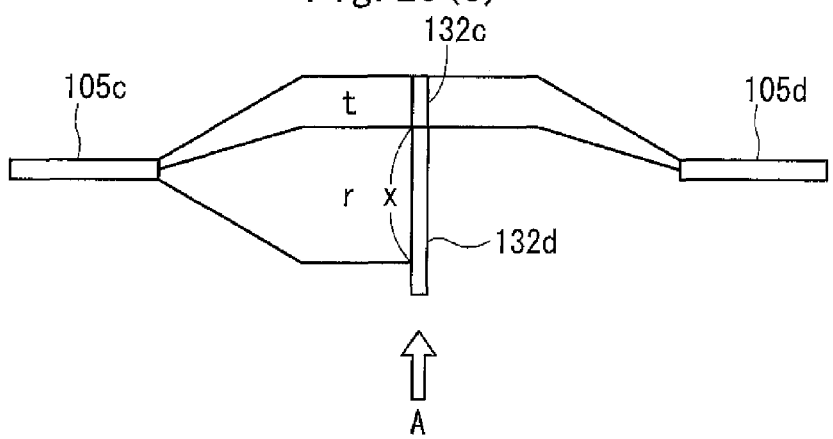

As can be understood therefrom, the value of the displacement x of the reflector plate 132d in FIG. 26(c) is larger than that in FIG. 26(b), which is larger than that in FIG. 26(a). As the value of the displacement x of the reflector plate 132d increases, the reflection factor r (that is, the intensity of the reflected light) increases, whereas the transmission factor t (that is, the intensity of the transmitted light) decreases.

Next, the operation of the position change sensor unit 130 will now be explained.

Physical measurement light coming from the measurement apparatus 102 goes into the optical coupler 131. The physical measurement light goes out to an optical fiber 105c to propagate through the dummy fiber 133. Then, the physical measurement light goes into the optical fiber collimating system 132.

At the optical fiber collimating system 132, the incident light, that is, the physical measurement light, is separated into transmitted light and reflected light each of which has an intensity corresponding to displacement caused by a change in the physical quantity of a measurement target object.

The transmitted light goes out to an optical fiber 105d.

On the other hand, the reflected light goes out to the optical fiber 105c. The dummy fiber 133 applies, to the path of the reflected light, an optical path difference from that of the transmitted light. The optical path difference is not smaller than the distance resolving power of the measurement apparatus 102.

The reflected light is multiplexed with the transmitted light at the optical coupler 131. After the multiplexing, the light propagates through the through main line 5 to go into the measurement apparatus 102. The PD 124 receives the light.

Next, a relationship between a change in the position of the reflector plate 132d (x) and the ratio of transmission factor/reflection factor (ζ) will now be explained.

Figure 27:
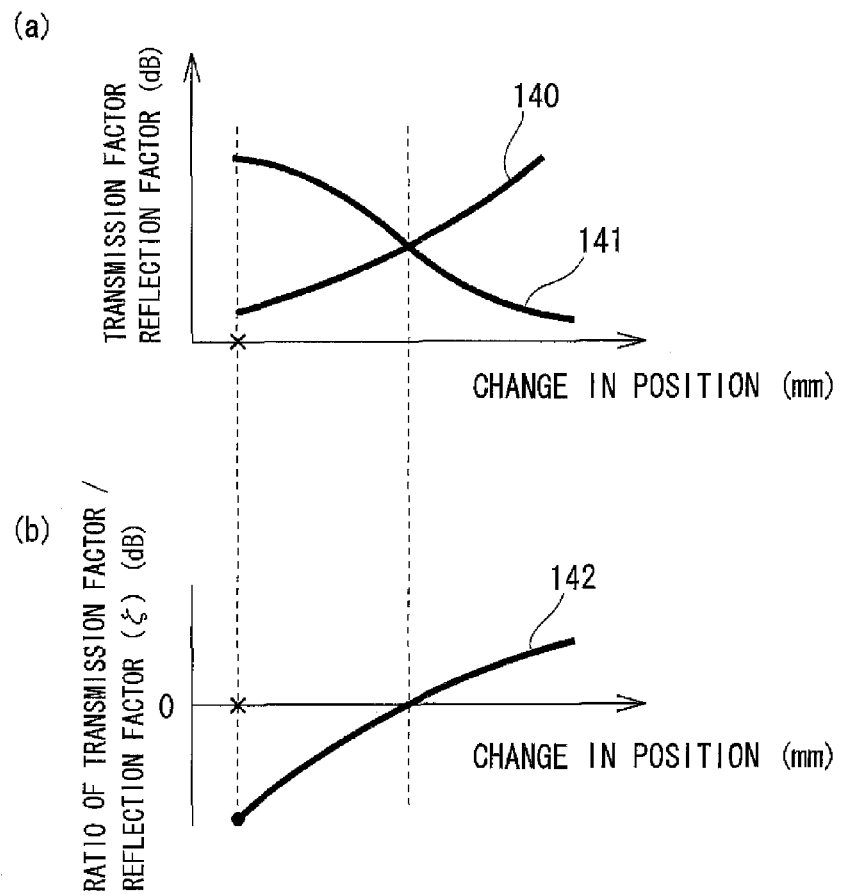
[FIG. 27]

FIG. 27(a) is a diagram that illustrates a relationship between a change in the position of the transparent plate 132c and the reflector plate 132d and transmission and reflection factors.

In FIG. 27(a), curves 140 and 141 indicate reflection and transmission factors, respectively. The abscissa of FIG. 27(a) represents a change in the position of the transparent plate 132c and the reflector plate 132d (x) [mm]. The ordinate thereof represents transmission and reflection factors [dB].

As illustrated therein, as a change in the position, which is denoted as x, of the transparent plate 132c and the reflector plate 132d increases, a reflection factor increases, whereas a transmission factor decreases. The transmission and reflection factors change complementarily.

FIG. 27(b) is a diagram that illustrates a relationship between a change in the position of the transparent plate 132c and the reflector plate 132d and the ratio of transmission factor/reflection factor (ζ). The abscissa of FIG. 27(b) represents a change in the position of the transparent plate 132c and the reflector plate 132d (x) [mm]. The ordinate thereof represents the ratio of transmission factor/reflection factor (ζ) [dB].

As indicated by a curve 142 therein, there is one-to-one correspondence between the change in position and the transmission/reflection ratio.

As will be understood from the above description, there is one-to-one correspondence between the change in position, which is information on the physical quantity of a measurement target object, and the transmission/reflection ratio.

Next, a method for calculating the transmission/reflection ratio (ζ) on the basis of the change in position (x) will now be explained.

Let a beam of light collimated by the lens 132a to have nearly parallel rays be a Gaussian beam.

Figure 28:
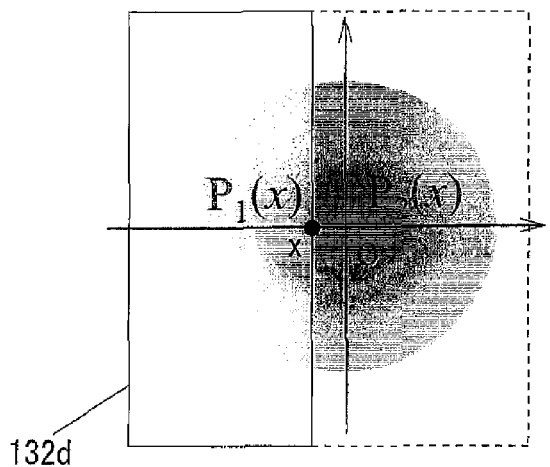
[FIG. 28]

FIG. 28 is a diagram that illustrates the cross-sectional distribution of a collimated beam. Each of the ordinate and abscissa of FIG. 28 represents the change in position (x).

Figure 29:
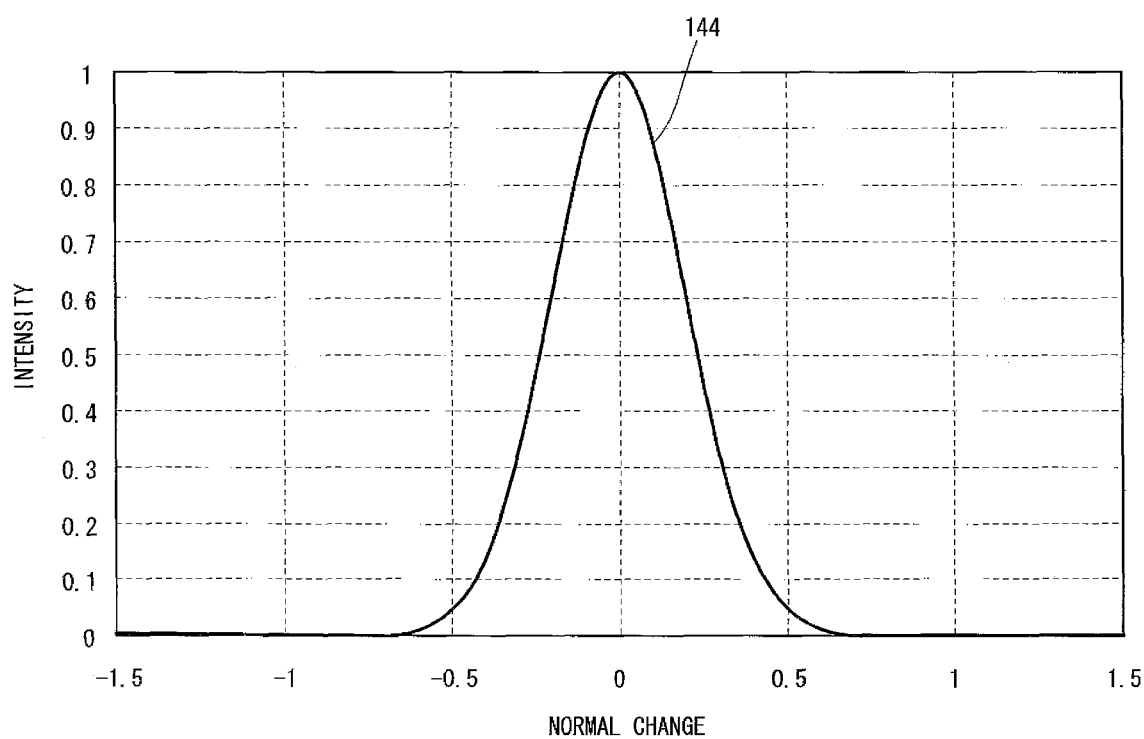
[FIG. 29]

FIG. 29 is a diagram that illustrates the cross-sectional distribution of the intensities of a collimated beam. The abscissa of FIG. 29 represents distance. The ordinate thereof represents optical intensity.

The cross-sectional distribution illustrated in FIG. 28 can be expressed mathematically as follows.

$$I(x, y) = e^{-\frac{x^2+y^2}{w^2}} \quad \text{[Formula 12]}$$

(where w denotes a ½ root (1/e width) of the diameter of a beam)

When the position of the transparent plate 132c and the reflector plate 132d is x, the intensity of reflected light and the intensity of transmitted light can be expressed by the following volume integrals $P_1(x)$ and $P_2(x)$, respectively.

Intensity of Reflected Light $$P_1(x) = \int_{-\infty}^{\infty} dy \int_{-\infty}^{x} e^{-\frac{x^2+y^2}{w^2}} dx \quad \text{[Formula 13]}$$

$$= \sqrt{\pi} w \int_{-\infty}^{x} e^{-\frac{x^2}{w^2}} dx$$

Intensity of Transmitted Light $$P_2(x) = \int_{-\infty}^{\infty} dy \int_{x}^{\infty} e^{-\frac{x^2+y^2}{w^2}} dx \quad \text{[Formula 14]}$$

$$= \sqrt{\pi} w \int_{x}^{\infty} e^{-\frac{x^2}{w^2}} dx$$

Let the transmission/reflection ratio for $P_1(X)$, $P_2(X)$ be denoted as ζ(x), which can be expressed as follows.

$$\zeta(x) = \frac{P_1(x)}{P_2(x)} = \frac{\int_{-\infty}^{x} e^{-\frac{x^2}{w^2}} dx}{\int_{x}^{\infty} e^{-\frac{x^2}{w^2}} dx} \quad \text{[Formula 15]}$$

If the change in position is sufficiently smaller than the diameter of a beam, the following approximation formulae can be derived.

$$\int_{-\infty}^{x} e^{-\frac{x^2}{w^2}} dx \approx \frac{\sqrt{\pi}}{2} w + 1 \quad \text{[Formula 16]}$$

$$\int_{x}^{\infty} e^{-\frac{x^2}{w^2}} dx \approx \frac{\sqrt{\pi}}{2} w - 1 \quad \text{[Formula 17]}$$

Therefore, the transmission/reflection factor ratio ζ can be expressed by the following approximation formula.

$$\zeta(x) \approx 1 + \frac{4x}{\sqrt{\pi}} \frac{x}{w} \quad \text{[Formula 18]}$$

The above approximation can be shown in decibel as follows.

$$\zeta(x) \approx \frac{40}{\sqrt{\pi} \ln 10} \frac{x}{w} (\text{dB}) = 0.98 \frac{x}{w} (\text{dB}) \quad \text{[Formula 19]}$$

As can be understood from the above formula, the decibel value of the transmission/reflection factor ratio (ζ) is equal to a change in position normalized with the width of a beam.

As described above, it is possible to calculate the transmission/reflection factor ratio (ζ) on the basis of the change in position (x). To put it the other way around, a change in position, which is information on the physical quantity of a measurement target object, can be calculated on the basis of transmission and reflection factors.

A simulation was run with the use of collimated light that has the cross-sectional distribution illustrated in FIG. 28 and the cross-sectional distribution of intensities illustrated in FIG. 29.

Figure 30:
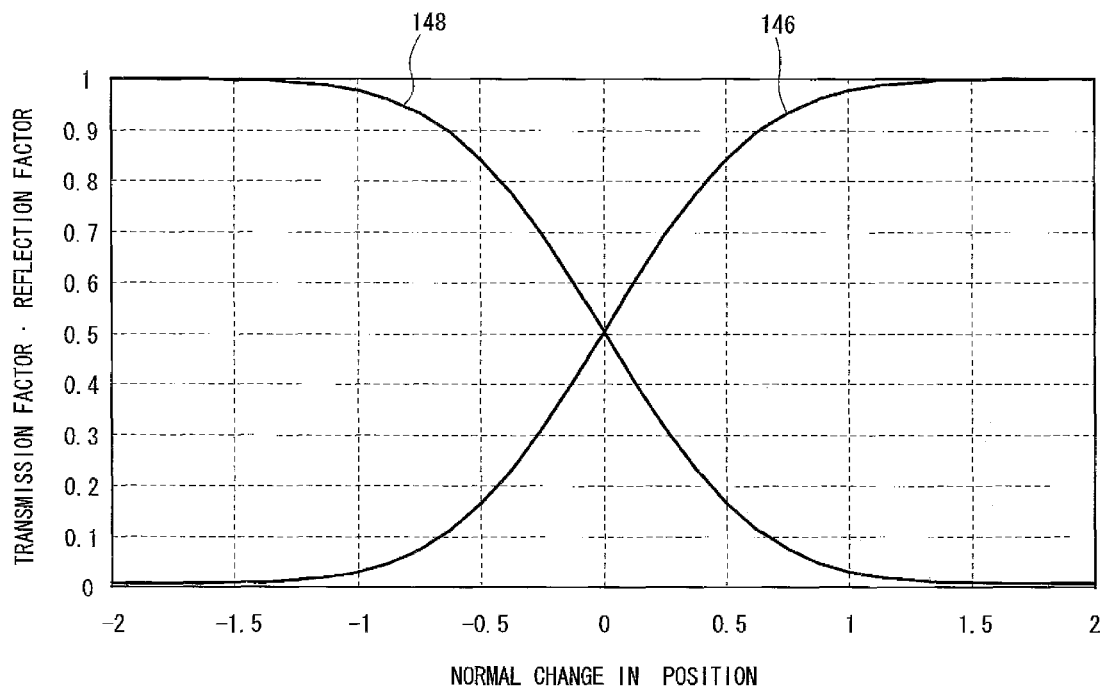
[FIG. 30]

FIG. 30 is a diagram that illustrates a change in transmission and reflection factors relative to a normal change in position x/w, which is displacement normalized with the beam diameter w of physical measurement light. As illustrated therein, the transmission and reflection factors change complementarily.

Figure 31:
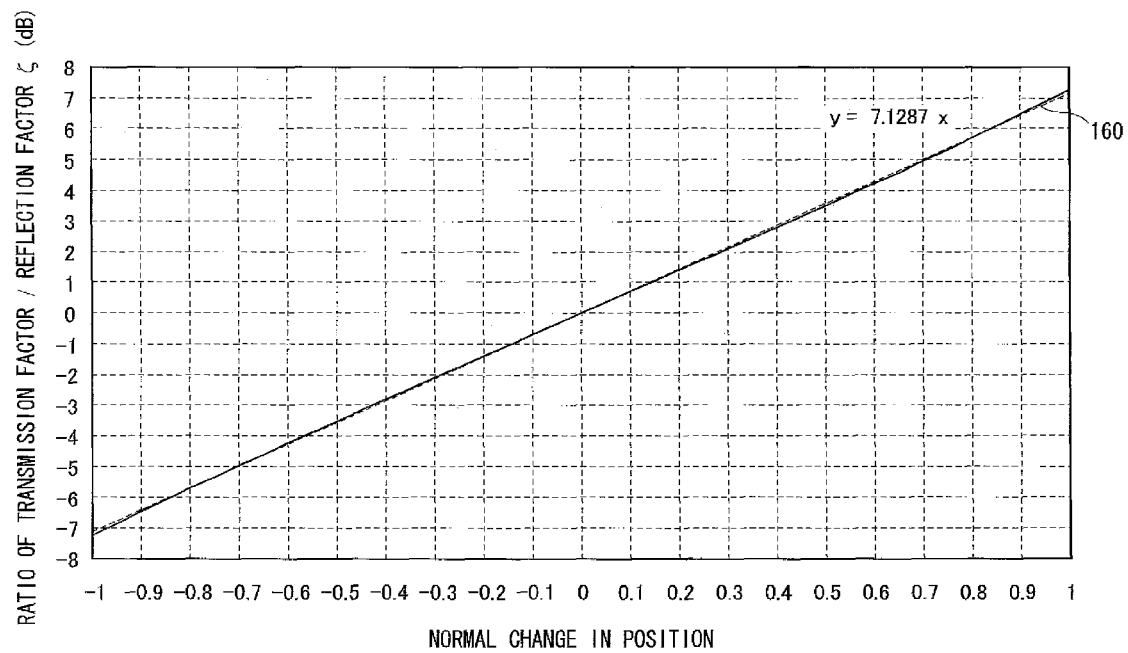
[FIG. 31]

FIG. 31 is a diagram that illustrates a change in the transmission/reflection factor ratio (ζ) relative to the normal change in position x/w in a range of |x/w|<1. Linearity increases as the value of |x/w| decreases.

Figure 32:
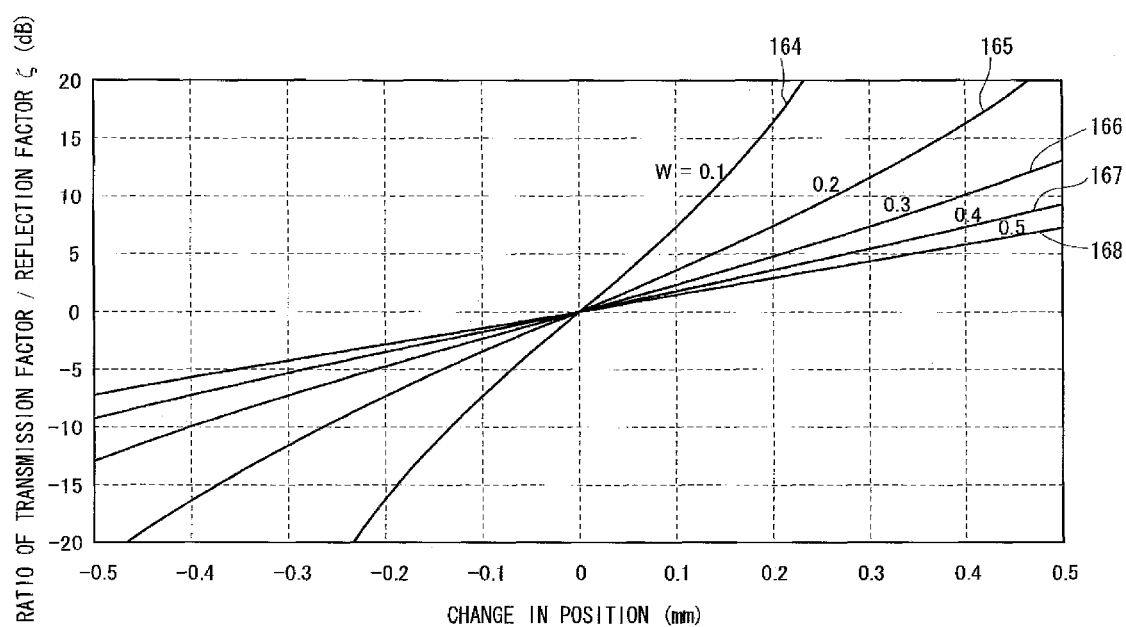
[FIG. 32]

FIG. 32 is a diagram that illustrates a change in the transmission/reflection factor ratio (ζ) relative to the change in position (x) with the beam diameter w taken as a parameter. As illustrated in FIG. 32, the gain of the transmission/reflection factor ratio (ζ) relative to the change in position (x) increases as the beam diameter w decreases. In addition, deviance from the line increases as the beam diameter w decreases.

Figure 33:
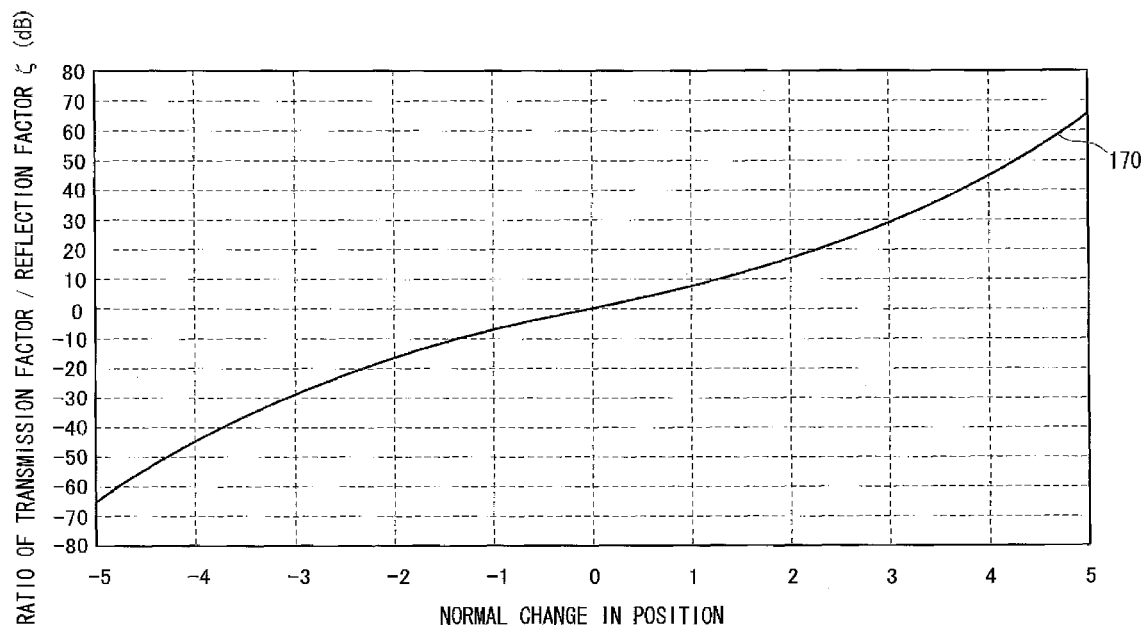
[FIG. 33]

FIG. 33 is a diagram that illustrates a change in the transmission/reflection factor ratio (ζ) relative to the normal change in position x/w. As illustrated in FIG. 33, there is excellent linearity in a range of |x/w|<1.

(Verification by Experiment)

An experiment was conducted by using the position change sensor unit 130 connected to the measurement apparatus 102.

Figure 34:
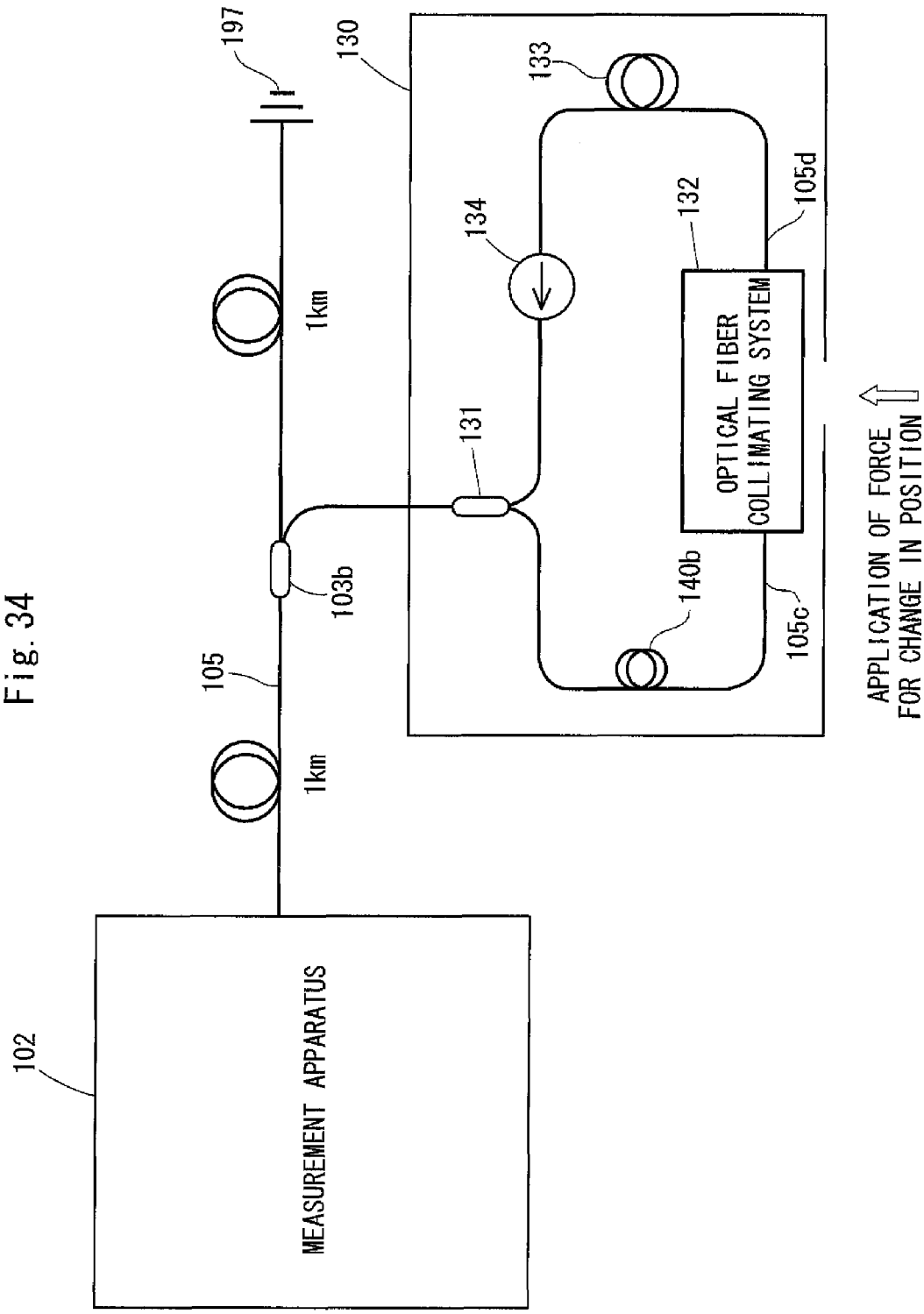
[FIG. 34]

FIG. 34 is a diagram that illustrates an experimental configuration.

As illustrated in FIG. 34, one end of the through main line 5 is connected to the measurement apparatus 102. The optical coupler 103b is provided at a distance of 1 km from the connection end. A sensor line branches from the through main line 5 at the optical coupler 103b. The other end of the through main line 5 is connected to a resistive terminator 197 at a distance of 1 km from the branching point, that is, the optical coupler 103b.

The chip rate of the PN code generator 121 of the measurement apparatus 102 is 12.5 MHz. The distance resolving power of the measurement apparatus 102 is: ΔL=8 m.

A dummy fiber 140b having a length of 60 m, which is larger than the distance resolving power ΔL, was provided in order to separate the connector reflection of the optical couplers 103b and 131 from reflection peaks of the displacement sensor.

In addition, a dummy fiber 133 having a length of 400 m was provided in order to give rise to an optical path difference between the path of transmitted light and that of reflected light. The optical path difference is not smaller than the distance resolving power of the measurement apparatus 2.

The configuration of the optical fiber collimating system 132 illustrated in FIG. 24 was used to create a setup. In the setup, the transparent plate 132c and the reflector plate 132d, which move together at the same time as the displacement of a detection target object, are provided and oriented perpendicular to the direction of a beam going through the (collimator) lenses 132a and 132b each having a beam diameter of 0.4. A displacement application device such as a load cell (not illustrated) applies a force for displacement to the transparent plate 132c and the reflector plate 132d.

Figure 35:
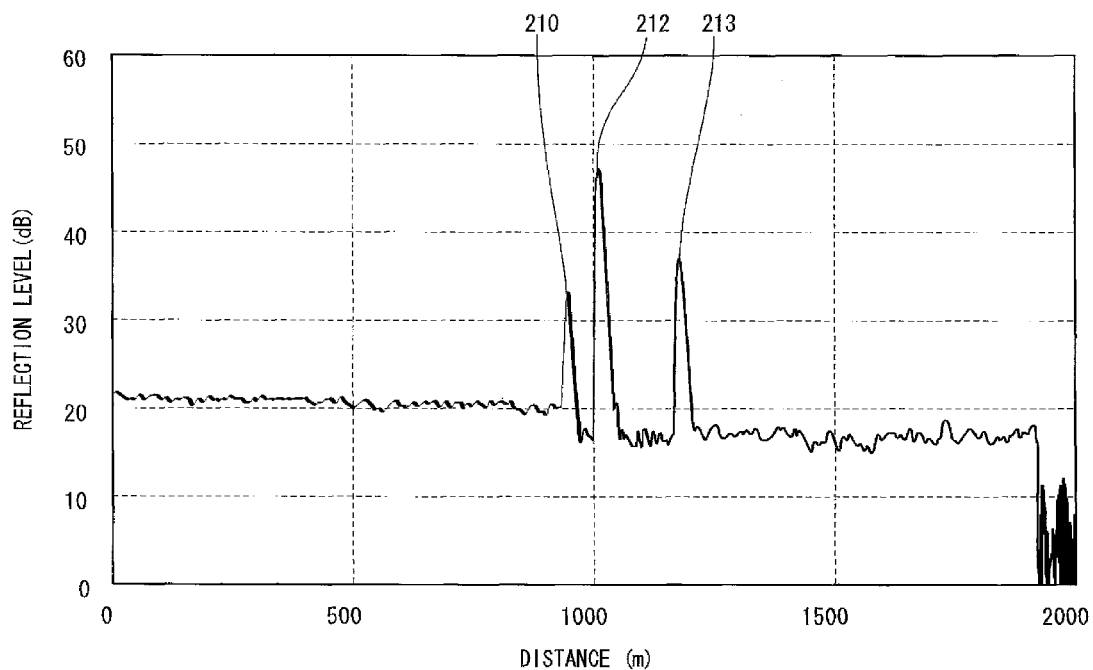
[FIG. 35]

FIG. 35 is a diagram that illustrates the waveform of reflex response when the displacement applied by the displacement application device is 0.21 mm. The abscissa of FIG. 35 represents distance [m]. The ordinate thereof represents reflection level [dB].

A reflection peak 210 illustrated therein corresponds to reflex response caused by connectors provided upstream and downstream of the optical coupler 103b and connectors provided upstream and downstream of the optical coupler 131. Since the installation distance between the optical coupler 103b and the optical coupler 131 is not larger than the distance resolving power of the measurement apparatus 102, the reflection peak 210 appears as a single peak.

Reflection peaks 212 and 213 correspond to reflex response caused by the transparent plate 132c and the reflector plate 132d; specifically, the reflection peak 212 is the reflex response of reflected light; the reflection peak 213 is the reflex response of transmitted light.

Figure 36:
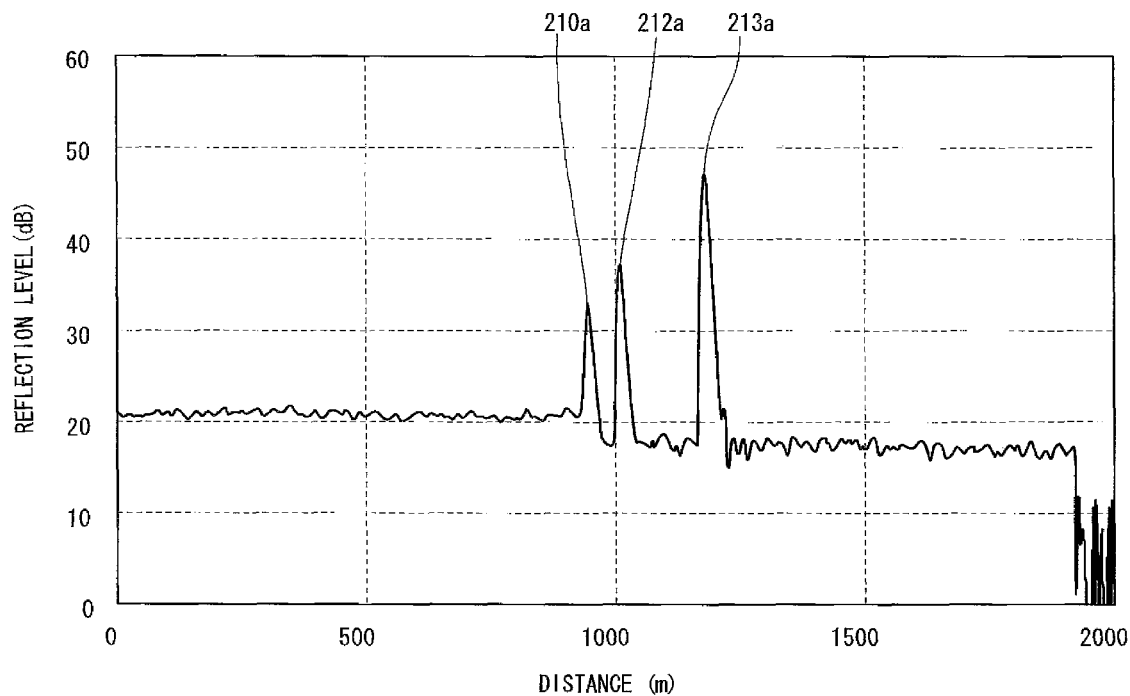
[FIG. 36]

FIG. 36 is a diagram that illustrates the waveform of reflex response when the displacement applied to the displacement sensor is 0.11 mm.

A reflection peak 210a illustrated therein corresponds to reflex response caused by connectors provided upstream and downstream of the optical coupler 103b and connectors provided upstream and downstream of the optical coupler 131. As explained above with reference to FIG. 35, since the installation distance between the two optical couplers is not larger than the distance resolving power of the measurement apparatus 102, the reflection peak 210a appears as a single peak.

Reflection peaks 212a and 213a correspond to reflex response caused by the transparent plate 132c and the reflector plate 132d; specifically, the reflection peak 212a is the reflex response of reflected light; the reflection peak 213a is the reflex response of transmitted light.

As will be understood from these drawings, the transmission peak and the reflection peak change in a push-pull manner (complimentarily).

Figure 37:
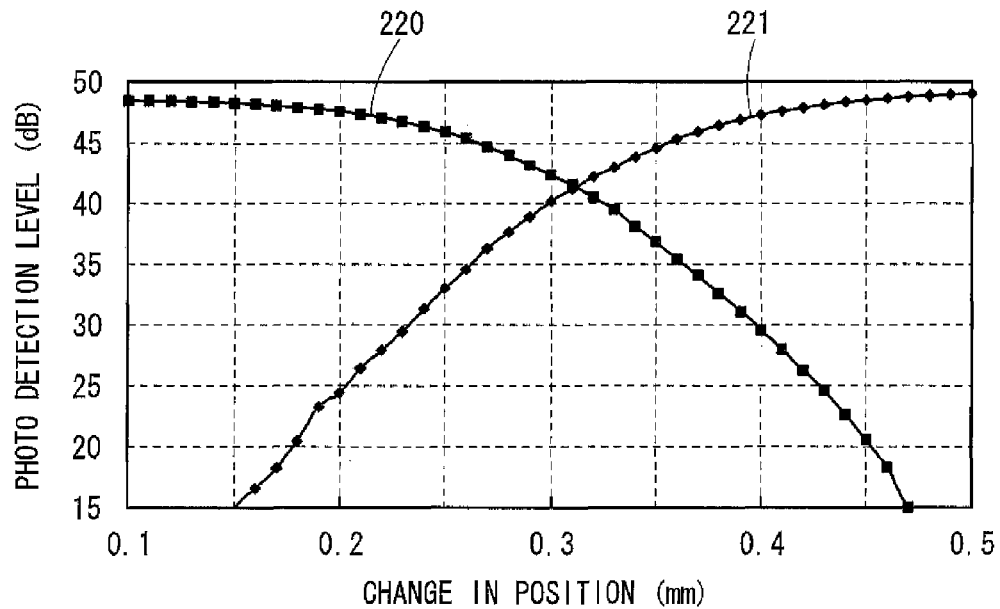
[FIG. 37]

FIG. 37 is a diagram that illustrates the photo detection level of transmitted light and the photo detection level of reflected light relative to the change in position (x). The abscissa of FIG. 37 represents the change in position [mm]. The ordinate thereof represents the photo detection level of transmitted light and the photo detection level of reflected light.

In FIG. 37, a curve 220 indicates the photo detection level of transmitted light. A curve 221 shown therein indicates the photo detection level of reflected light. As will be understood from the drawing, the levels also change in a push-pull manner (complimentarily).

Figure 38:
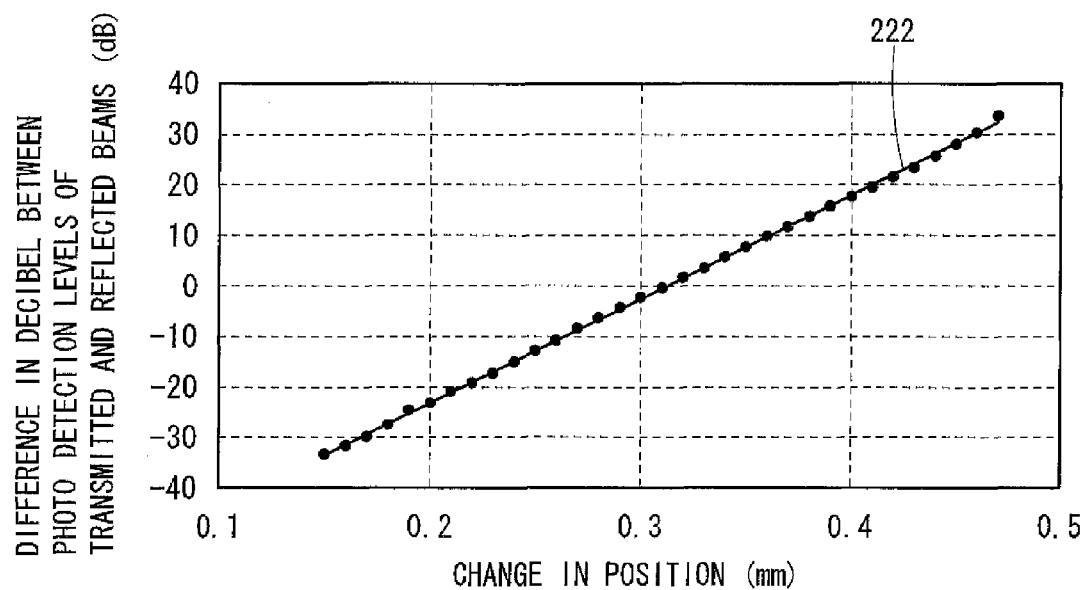
[FIG. 38]

FIG. 38 is a diagram that illustrates a relationship between the change in position (x) and the ratio of the photo detection level of transmitted light/the photo detection level of reflected light (ζ). The abscissa of FIG. 38 represents the change in position (x). The ordinate thereof represents the difference in decibel between the photo detection level of transmitted light and the photo detection level of reflected light [dB].

As shown by a line 222 in FIG. 38, the relationship between the change in position and the difference in decibel can be expressed as a linear function, which proves sensing with excellent linearity. It is possible to find the change in position on the basis of the transmission/reflection factor ratio (ζ) obtained while using the line 222 as a calibration curve.

As described above, it is possible to calculate a change in position, which is information on the physical quantity of a measurement target object, on the basis of transmitted and reflected light from a position change sensor unit.

EXAMPLE 2

Next, a second example according to the present embodiment of the invention will now be explained.

In this example, a temperature-sensing reflective sensor unit that is used for detecting temperature information as information on the physical quantity of a measurement target object is described.

Figure 39:
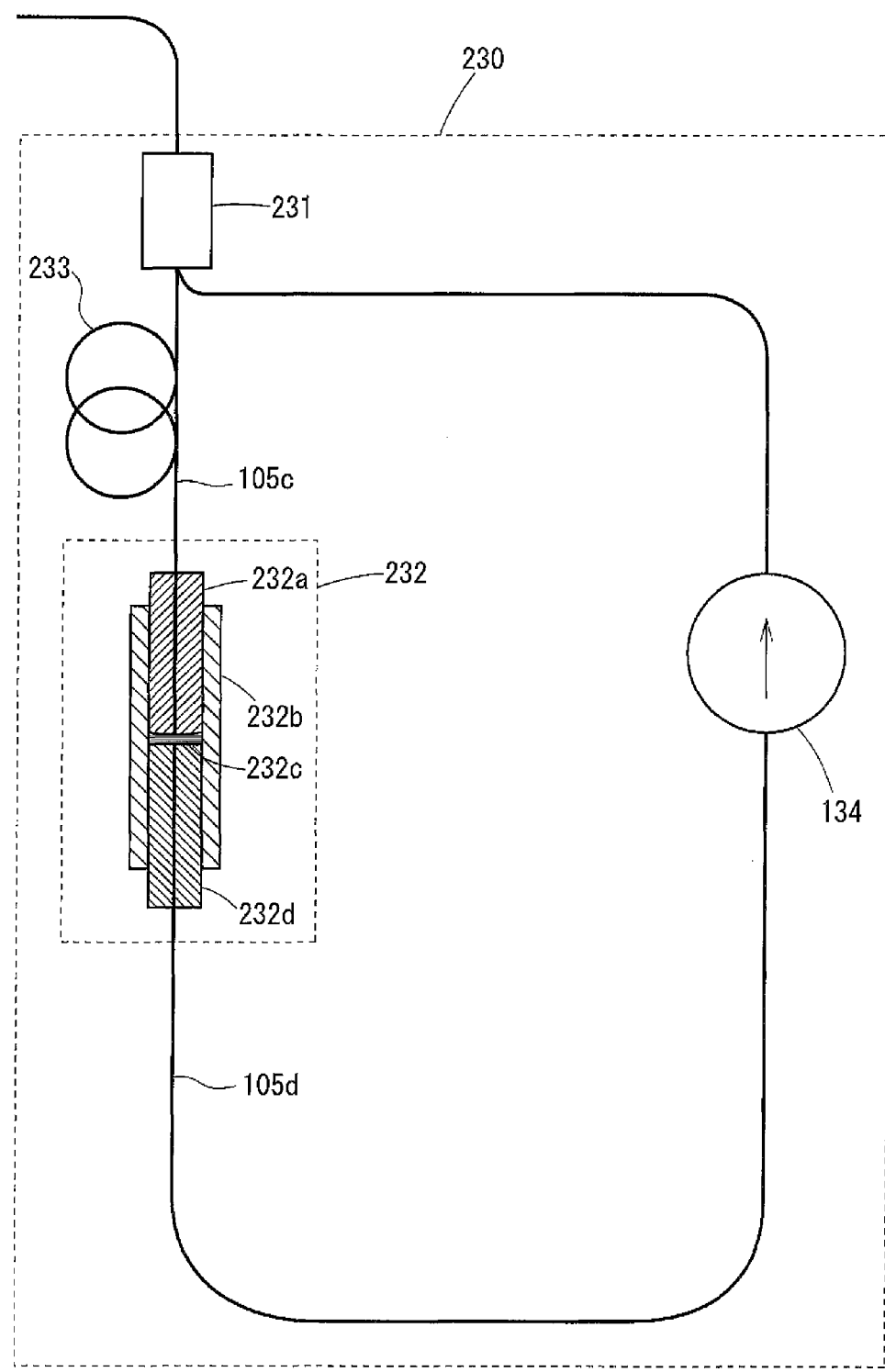
[FIG. 39]

FIG. 39 is a diagram that illustrates the configuration of a temperature sensor unit 230, which is a temperature-sensing reflective sensor unit.

As illustrated in FIG. 39, the temperature sensor unit 230 includes an optical coupler 231, a reflecting system 232, a dummy fiber 233, the isolator 134, etc.

The reflecting system 232 includes a first ferrule 232a, a sleeve 232b, a second ferrule 232d, etc.

A dielectric multilayer film is vapor-deposited on an end face of the second ferrule 232d as a tilt filter 232c. As the reflection property of the tilt filter 232c, its reflection factor changes as the temperature of a measurement target object changes.

Next, the operation of the temperature sensor unit 230 will now be explained.

Physical measurement light coming from the measurement apparatus 102 goes into the optical coupler 231. The physical measurement light propagates through the dummy fiber 233 onto the optical fiber 105c. Then, the physical measurement light goes into the reflecting system 232.

At the reflecting system 232, the incident light is separated into transmitted light and reflected light with transmission and reflection factors in accordance with the temperature of a measurement target object.

The transmitted light goes out to the optical fiber 105d. The transmitted light goes through the isolator 134 into the optical coupler 131.

On the other hand, the reflected light goes out to the optical fiber 105c. The dummy fiber 233 applies, to the path of the reflected light, an optical path difference from that of the transmitted light. The optical path difference is not smaller than the distance resolving power of the measurement apparatus 102. Then, the reflected light goes into the optical coupler 231 to be multiplexed with the transmitted light.

Combination light, which is generated when the reflected light is multiplexed with the transmitted light, propagates through the through main line 5 to go into the measurement apparatus 102, followed by photo detection at the PD 124.

Since the processing of the light having entered the measurement apparatus 102 is the same as that of Example 1, it is not explained here.

An experiment was conducted by using the temperature sensor unit 230 connected to the measurement apparatus 102.

The wavelength of the physical measurement light that goes into the optical fiber from the measurement apparatus 102 was set at 1537.64 [nm]. The left half of the spectrum of a single cavity (a photorefractive material: $TiO_2$, a low refractive material: $SiO_2$) dielectric multilayer film band pass filter was used for the tilt filter.

Figure 40:
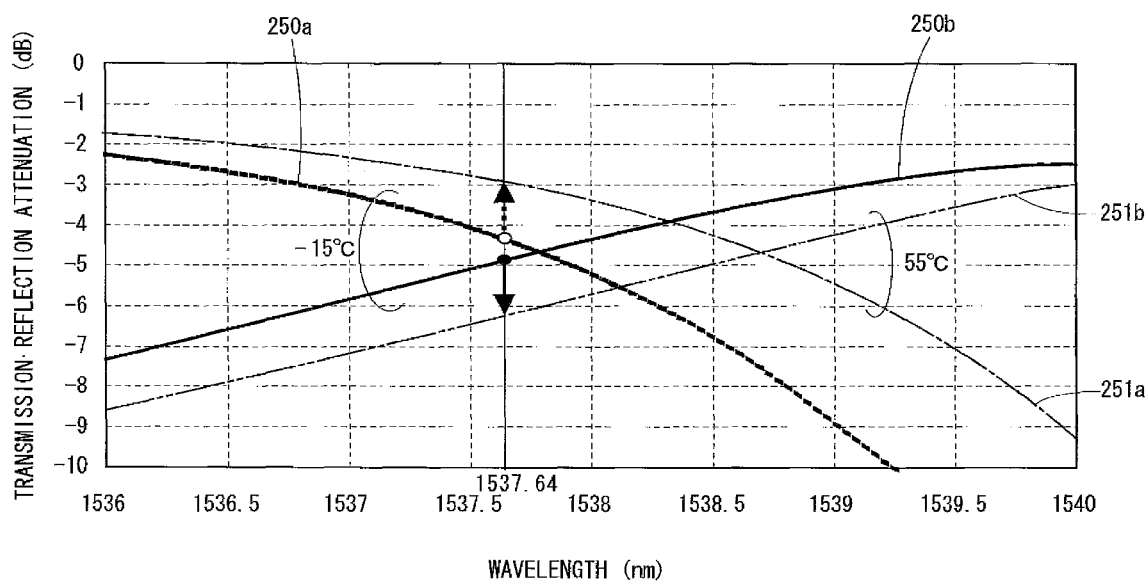
[FIG. 40]

FIG. 40 is a diagram that illustrates a relationship between an increase in temperature and the transmission•reflection spectrum of the tilt filter. The abscissa of FIG. 40 represents wavelength [nm]. The ordinate thereof represents transmission•reflection attenuation [dB].

Solid curves 250a and 250b illustrated in FIG. 40 indicate transmission and reflection characteristics at a temperature of −15° C. (hereinafter referred to as "transmission characteristic curve"). Dotted curves 251a and 251b illustrated therein indicate transmission and reflection characteristics at a temperature of 55° C. (hereinafter referred to as "reflection characteristic curve").

As will be understood from the drawing, the transmission characteristic curve and the reflection characteristic curve shift toward the long wavelength region as temperature increases.

Figure 41:
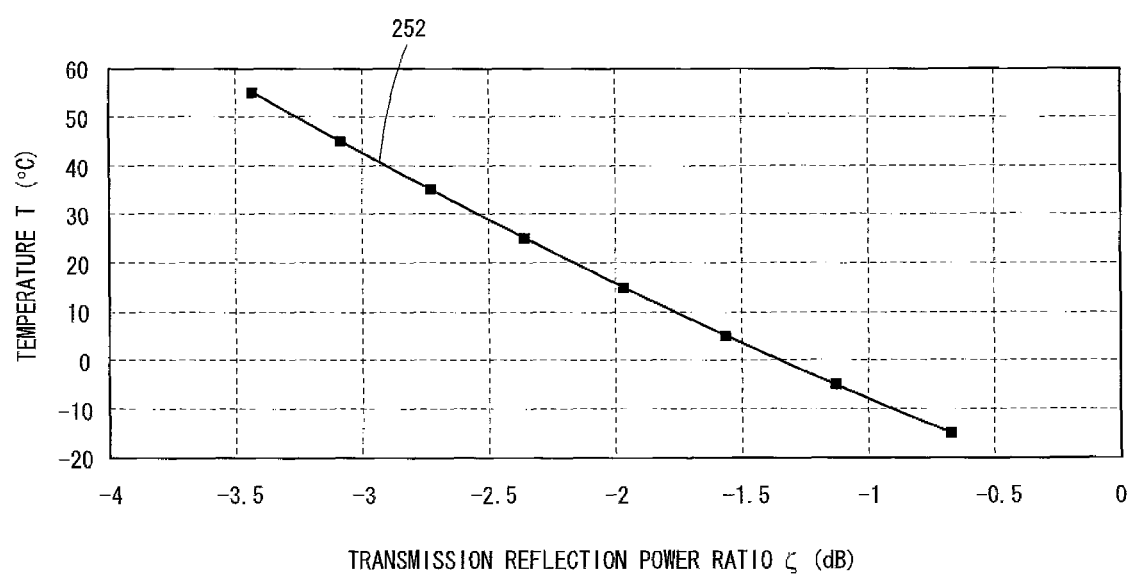
[FIG. 41]

FIG. 41 is a diagram that illustrates a relationship between the transmission/reflection factor ratio (ζ) and temperature. The abscissa of FIG. 41 represents transmission/reflection power ratio (ζ). The ordinate thereof represents actual temperature measured by means of a platinum resistance thermometer provided near the filter (° C.).

In FIG. 41, a curve 252 indicates actual temperature measured by means of the platinum resistance thermometer. Points plotted therein indicate values of temperature obtained by means of the temperature sensor unit 140.

As illustrated in the drawing, there is one-to-one correspondence between the actual temperature measured by means of the platinum resistance thermometer and the transmission/reflection power ratio. Therefore, it is possible to find temperature by using the curve shown therein as a calibration curve.

EXAMPLE 3

Next, a third example according to the present embodiment of the invention will now be explained.

As in the above example, a temperature sensor unit that is used for detecting temperature information as information on the physical quantity of a measurement target object is described here.

Figure 42:
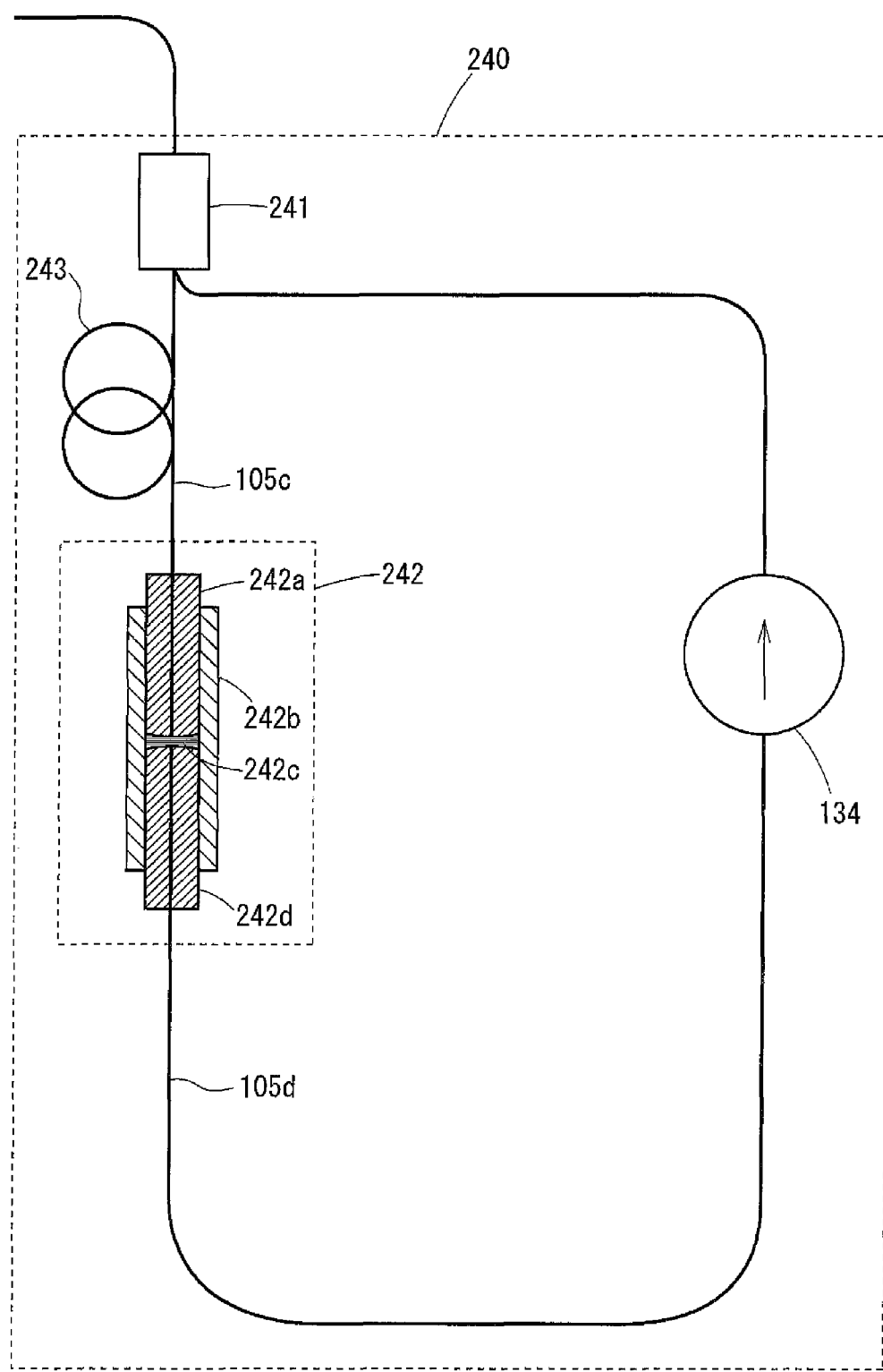
[FIG. 42]

FIG. 42 is a diagram that illustrates an example of a temperature sensor unit 240.

As illustrated in FIG. 42, the reflective sensor unit 240 includes an optical coupler 241, a reflecting system 242, a dummy fiber 243, the isolator 134, etc.

The reflecting system 142 includes two ferrules 242a and 242d, a sleeve 242b, and a tilt filter 242c (or a "boardless" filter). The tilt filter 242c, which is a filter formed by vapor-depositing a dielectric multilayer film on a film such as a polyimide film, is sandwiched between the two ferrules 242a and 242d inside the sleeve 242b.

An experiment similar to that of Example 2 was conducted by using the temperature sensor unit 240 connected to the measurement apparatus 102.

As a result of the experiment, a graph that is similar to that of FIG. 40 and indicates reflection and transmission factors relative to light incident on the tilt filter 242c was obtained.

As in Example 2 explained with reference to FIG. 40, the transmission and reflection factors of the tilt filter 242c change in a push-pull manner (complimentarily) as the temperature of a measurement target object changes.

The explanation of the graph is not given here because it is the same as that of FIG. 40. In addition, the operation of the temperature sensor unit 140, the processing of the measurement apparatus 102, etc. is not explained here because it is the same as that explained in Example 2.

As described above, the filter separates physical measurement light having entered the optical fiber into transmitted light and reflected light whose intensity changes in a push-pull manner (complimentarily) in accordance with the temperature of a measurement target object. The beams go into the measurement apparatus. The measurement apparatus calculates the ratio of the gain of the transmitted light and the gain of the reflected light to detect information on temperature.

EXAMPLE 4

Next, a fourth example according to the present embodiment of the invention will now be explained.

In this example, a position change sensor unit 250 and a temperature sensor unit 251 are installed on the same optical fiber connected to the measurement apparatus 102 for concurrent measurement of a change in position and temperature.

Figure 43:
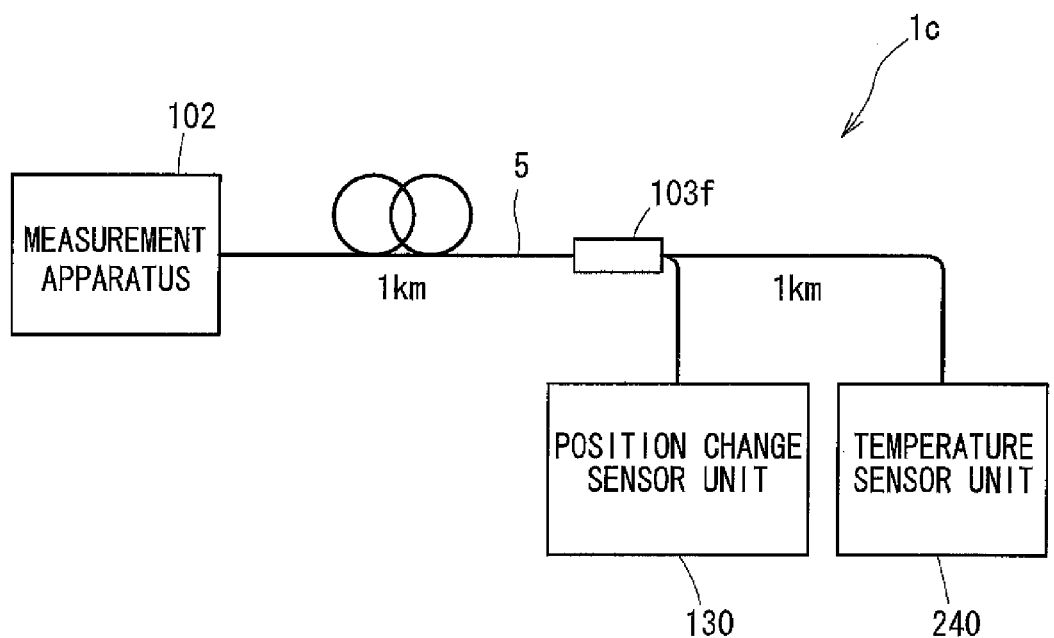
[FIG. 43]

As illustrated in FIG. 43, an optical fiber sensing system 1c includes the measurement apparatus 102, an optical coupler 103f, the position change sensor unit 130, the temperature sensor unit 240, etc. The position change sensor unit 130 is provided at a distance of 1 km from the measurement apparatus 102. The temperature sensor unit 240 is provided at a distance of 2 km from the measurement apparatus 102.

The length of a dummy fiber included in each of the position change sensor unit 130 and the temperature sensor unit 240 is 200 m. Since the function, configuration, etc., of each of the measurement apparatus 102, the optical coupler 103f, the position change sensor unit 130, and the temperature sensor unit 240 is the same as that explained in the above example, it will not be explained here.

Figure 44:
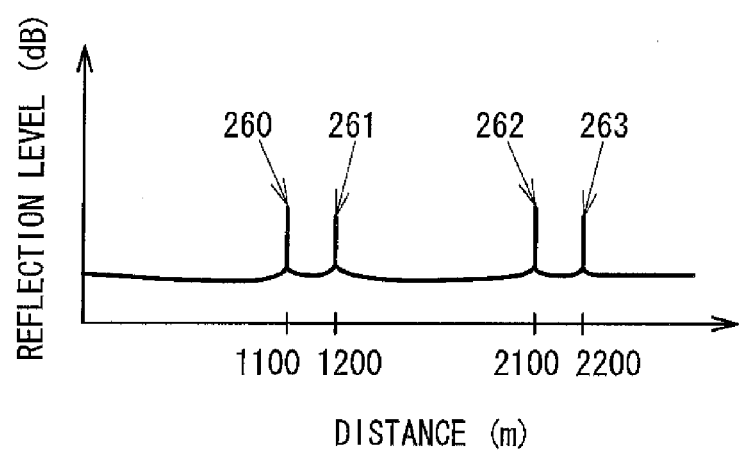
[FIG. 44]

FIG. 44 is a diagram that illustrates the reflex response of each of the position change sensor unit 130 and the temperature sensor unit 240. The abscissa of FIG. 44 represents distance [m]. The ordinate thereof represents reflection level [dB].

In FIG. 44, a reflection peak 260 is the response of transmitted light coming from the position change sensor unit 130. The transmitted light is delayed with respect to the distance from the measurement apparatus 102 to the position change sensor unit 130 (1 km) by a delay amount equal to a half of the length (200 m) of the dummy fiber.

A reflex response 261 is the response of reflected light coming from the position change sensor unit 130. The reflected light is delayed with respect to the distance from the measurement apparatus 102 to the position change sensor unit 130 (1 km) by a delay amount equal to the length (200 m) of the dummy fiber.

A reflection peak 262 is the response of transmitted light coming from the temperature sensor unit 240. The transmitted light is delayed with respect to the distance from the measurement apparatus 102 to the temperature sensor unit 240 (2 km) by a delay amount equal to a half of the length (200 m) of the dummy fiber.

A reflex response 263 is the response of reflected light coming from the temperature sensor unit 240. The reflected light is delayed with respect to the distance from the measurement apparatus 102 to the temperature sensor unit 240 (2 km) by a delay amount equal to the length (200 m) of the dummy fiber.

As described above, even when the physical quantity of a measurement target object includes different physical quantity parameters such as change in position and temperature explained above, it is possible to measure them by means of a single optical fiber sensing system.

Next, an improved version of an optical fiber sensing system according to the second embodiment of the invention will now be explained.

Since the reflective sensor unit described above includes an isolator, it has a disadvantage in that its manufacturing cost is high. As another disadvantage, fluctuations in the constituent elements of the reflective sensor unit could have an influence on measurement accuracy. To overcome these disadvantages, an improved reflective sensor unit will now be explained.

Figure 45:
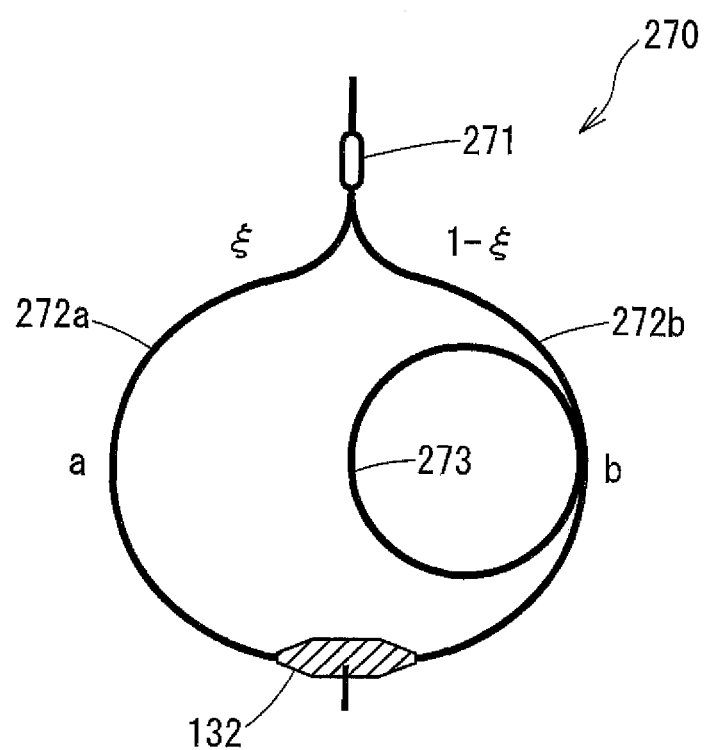
[FIG. 45]

FIG. 45 is a diagram of an improved reflective sensor unit.

As illustrated in FIG. 45, a reflective sensor unit 270 includes a spectroscope 271 for splitting physical measurement light with a bifurcation ratio of $\xi:1-\xi$, a dummy fiber 273 having a length L, the optical fiber collimating system 132, etc.

The transmission loss factor of one optical path 272a is denoted as "a". The transmission loss factor of the other optical path 272b is denoted as "b".

Next, the propagation of physical measurement light, which comes from the measurement apparatus 102, will now be explained.

Physical measurement light that has entered the spectroscope 271 is split onto the optical paths 272a and 272b, which bifurcate at the spectroscope 271, with the bifurcation ratio of $\xi:1-\xi$. Light going out from the spectroscope 271 to the optical path 272a goes into the optical fiber collimating system 132. The light is separated at the optical fiber collimating system 132 into first transmitted light and first reflected light with the ratio of t:r. The first reflected light goes out from the optical fiber collimating system 132 to the optical path 272a. The first transmitted light goes out from the optical fiber collimating system 132 to the optical path 272b.

On the other hand, light going out from the spectroscope 271 to the optical path 272b propagates through the dummy fiber 273. Thereafter, the light goes into the optical fiber collimating system 132. The light is separated at the optical fiber collimating system 132 into second transmitted light and second reflected light with the ratio of t:r. The second transmitted light goes out from the optical fiber collimating system 132 to the optical path 272a. The second reflected light goes out from the optical fiber collimating system 132 to the optical path 272b.

Next, the intensity of the beams received by the PD 124 is calculated.

The PD 124 receives the first reflected light before the other beams.

The intensity of the first reflected light can be expressed by the following formula.

$$R_1 = \xi^2 a^2 r \qquad \text{[Formula 20]}$$

Next, the PD 124 receives combined light of the first transmitted light and the second transmitted light after optical multiplexing at the optical coupler 271.

The intensity of the combined light can be expressed by the following formula.

$$R_2 = 2\xi(1-\xi)abt \qquad \text{[Formula 21]}$$

The PD 124 receives the second reflected light after the other beams.

The intensity of the second reflected light can be expressed by the following formula.

$$R_3 = (1-\xi)^2 b^2 \qquad \text{[Formula 22]}$$

Since the length of the dummy fiber 26 is L, the relative distance of the first reflected light, the combination of the first transmitted light and the second transmitted light, and the second reflected light is L, 2L when the first reflected light is taken as a reference (0).

Next, calculation amount $\zeta$ is defined as follows.

$$\zeta^2 = \frac{R_2^2}{4R_1 R_3} \qquad \text{[Formula 23]}$$

The following formula can be derived when $R_1$, $R_2$, and $R_3$ are substituted into the above formula.

$$\zeta^2 = \frac{4\xi^2(1-\xi)^2 a^2 b^2}{4\xi^2(1-\xi)^2 a^2 b^2} \frac{t^2}{r^2} = \frac{t^2}{r^2} \qquad \text{[Formula 24]}$$

id est $$\zeta = \frac{t}{r} \qquad \text{[Formula 25]}$$

Thus, $\zeta$ bears no relation to $\xi$, a, b. This means that, even when the parameters of a reflective sensor unit change, it will have no influence on measurement accuracy.

It is the shift analyzer 131 that performs the above calculation.

With the above configuration, even when the transmission loss factor of the optical path of transmitted light and the transmission loss factor of the optical path of reflected light change depending on temperature, humidity, and the like, it is possible to carry out measurement with high precision without being affected by the change.

As described in the first and second embodiments, in an optical fiber sensing system according to an aspect of the invention, physical measurement light having entered an optical fiber is separated into transmitted light and reflected light at a reflective sensor unit. A ratio of the gain of the transmitted light and the gain of the reflected light (a difference in decibel) is calculated, thereby offsetting their fluctuations and influences. By this means, measurement can be carried out with high precision.

A measurement apparatus can receive transmitted light and reflected light by means of a single photo detector. Therefore, for example, as compared with a configuration in which a photo detector that receives transmitted light is different from a photo detector that receives reflected light, it is possible to carry out measurement with high precision because measurement accuracy is not influenced by a difference in the characteristics of the photo detectors.

Moreover, since a pseudo random code correlation method is used for measuring the physical quantity of a measurement target object, it is possible to control the dynamic range of light entering an optical fiber easily by adjusting the length of a PN code. For example, it is possible to measure a very small change in the physical quantity of a measurement target object by using a long code.

Figure 46:
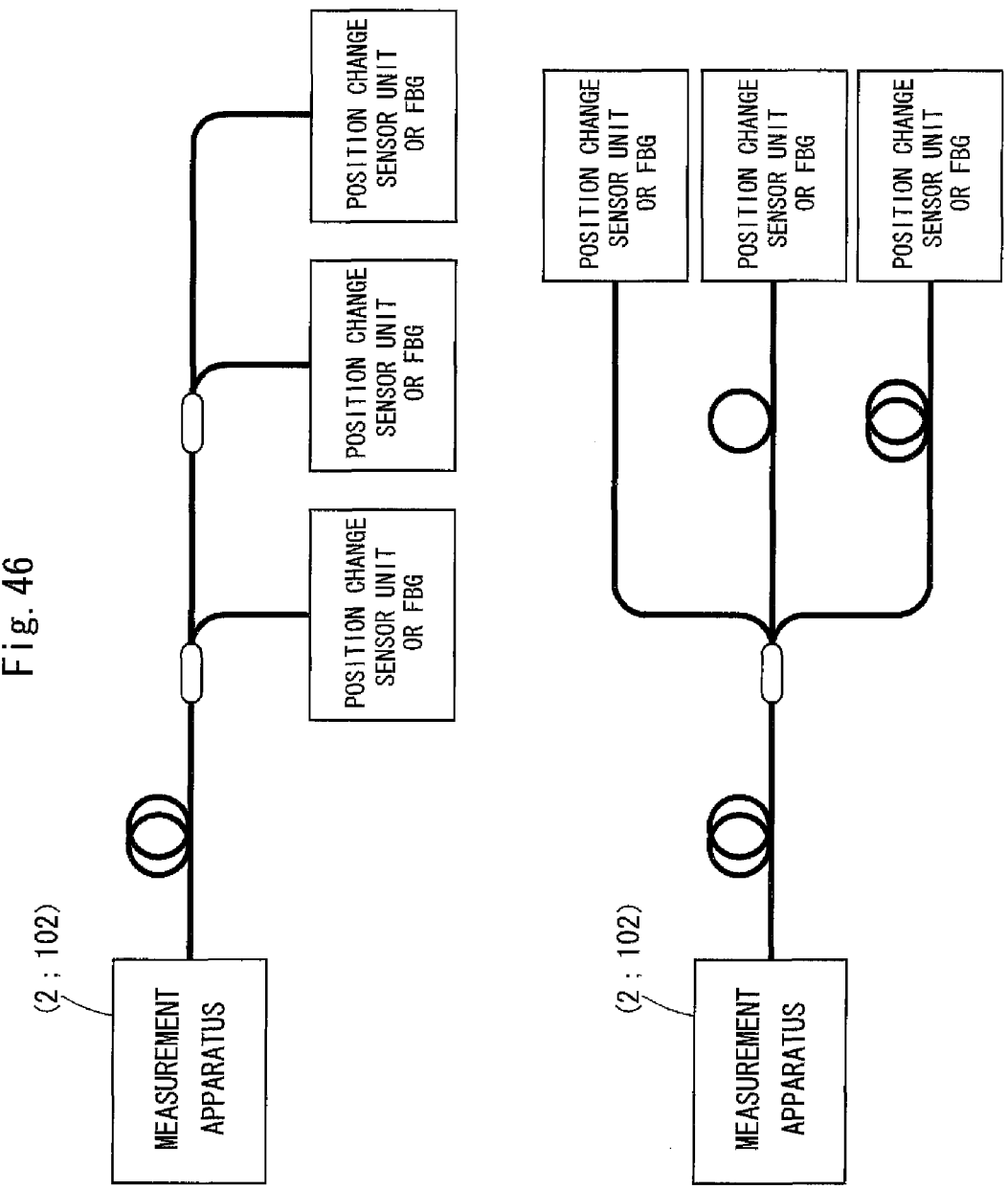
[FIG. 46]

In the foregoing embodiments of the invention, a plurality of optical couplers is inserted in cascade, that is, serially, on an optical fiber as illustrated in FIG. 46(a). An FBG, etc., is connected to the end of each of a plurality of fiber lines branching at the optical couplers, inclusive of one at the end of the fiber main. However, the scope of the invention is not limited thereto. For example, it may be modified as illustrated in FIG. 46(b). In the modified configuration, a single optical coupler is inserted on an optical fiber. The optical fiber branches into a plurality of parallel fiber lines at the optical coupler. An FBG, etc., is connected to the end of each of the branch lines.

The invention claimed is:

1. An optical fiber sensing system comprising:
   a circulator that has first, second, and third ports, the first port being connected to a light source that outputs physical measurement light;
   an optical fiber that is connected to the second port of the circulator;
   at least one reflective sensor that is connected to an end of the optical fiber, the reflective sensor returning light with a reflection spectrum obtained by modulating the physical measurement light in accordance with a change in physical quantity of a measurement target object to the optical fiber;
   an optical coupler that is connected to the third port of the circulator;
   an optical path that includes a light separating section and a dummy fiber, the light separating section being connected to one of two branch lines bifurcating at the optical coupler, the light separating section separating incoming light into two beams of light whose transmission and reflection levels change complementarily in accordance with a change in the reflection spectrum of the return light from the reflective sensor, the light separating section returning one of the two separated beams of light to the optical coupler, the dummy fiber being connected at one end to the light separating section, the dummy fiber adding a predetermined time difference or optical path difference to the one of the two beams of light separated by the light separating section, the optical path being formed by connecting the other end of the dummy fiber and the other of the two branch lines bifurcating at the optical coupler, the optical path returning the other of the two beams of light separated by the light separating section after incidence through the one of the two branch lines bifurcating at the optical coupler from the optical coupler, the other of the two separated beams of light being returned to the optical coupler via the other of the two branch lines bifurcating at the optical coupler;
   a light receiving section that receives the two beams of light separated by the light separating section with the time difference therebetween from the optical coupler and further receives another beam of light having propagated through the optical path from the optical coupler; and
   a section that calculates amount of the physical change of the measurement target object for detection on the basis of an intensity ratio of the three beams of light received by the light receiving section,
   wherein the light separating section includes one wavelength tilt filter and another circulator, and
   the section that calculates the amount of the physical change for detection includes a PN code generator that generates a pseudo random signal, a section that modulates the physical measurement light on the basis of the pseudo random signal generated by the PN code generator, a section that converts the three beams of light received by the light receiving section into electric signals; and a section that correlates the electric signals obtained by the conversion with the pseudo random signal sent from the PN code generator to calculate the intensity of the one of the two beams of light and the intensity of the other.

2. The optical fiber sensing system according to claim 1, wherein a branching optical coupler is provided each for branching an optical path from the optical fiber; and the reflective sensor unit is provided each on the optical branch path.

3. The optical fiber sensing system according to claim 1, wherein a branching optical coupler is provided for branching a plurality of optical paths from the optical fiber; and the reflective sensor unit is provided on each of the plurality of optical branch paths.

4. The optical fiber sensing system according to claim 1, wherein a single light receiving section receives two separated beams of light.

5. An optical fiber sensing system comprising:
   a circulator that has first, second, and third ports, the first port being connected to a light source that outputs physical measurement light;
   a first optical fiber that is connected to the second port of the circulator;
   at least one reflective sensor that is connected to an end of the first optical fiber, the reflective sensor returning light with a reflection spectrum obtained by modulating the physical measurement light in accordance with a change in physical quantity of a measurement target object to the first optical fiber;
   a light separating section that is connected to the third port of the circulator, the light separating section separating incoming light into two beams of light whose intensity changes complementarily in accordance with a change in the reflection spectrum of the return light from the reflective sensor;
   second and third optical fibers that are optical paths of the respective two beams of light coming from the light separating section;
   a dummy fiber that is connected to the second optical fiber, the dummy fiber adding a predetermined time difference or optical path difference to one of the two beams of light separated by the light separating section;
   an optical coupler that couples an end of the third optical fiber with an end of the dummy fiber;
   a light receiving section that receives the light from the optical coupler; and a section that calculates amount of the physical change of the measurement target object for detection on the basis of a ratio of the intensity of said one of the two beams of light and the intensity of the other, wherein the section that calculates the amount of the physical change for detection includes a PN code generator that generates a pseudo random signal, a section that modulates the physical measurement light on the basis of the pseudo random signal generated by the PN code generator, a section that converts the two beams of light received by the light receiving section into electric signals, and a section that correlates the electric signals obtained by the conversion with the pseudo random signal sent from the PN code generator to calculate the intensity of said one of the two beams of light and the intensity of the other.

6. The optical fiber sensing system according to claim 5, further comprising a temperature control mechanism that keeps ambient temperature of the light separating section constant.

7. The optical fiber sensing system according to claim 5, wherein a branching optical coupler is provided each for branching an optical path from the optical fiber; and the reflective sensor is provided each on the optical branch path.

8. The optical fiber sensing system according to claim 5, wherein a branching optical coupler is provided for branching a plurality of optical paths from the optical fiber; and the reflective sensor is provided on each of the plurality of optical branch paths.

9. The optical fiber sensing system according to claim 5, wherein a single light receiving section receives two separated beams of light.

* * * * *